United States Patent
Cawthorne et al.

(10) Patent No.: US 6,946,818 B2
(45) Date of Patent: Sep. 20, 2005

(54) METHOD OF DETERMINING BATTERY POWER LIMITS FOR AN ENERGY STORAGE SYSTEM OF A HYBRID ELECTRIC VEHICLE

(75) Inventors: William R. Cawthorne, Milford, MI (US); Steve T. West, New Palestine, IN (US)

(73) Assignee: General Motors Corporation, Detroit, MI (US)

( * ) Notice: Subject to any disclaimer, the term of this patent is extended or adjusted under 35 U.S.C. 154(b) by 129 days.

(21) Appl. No.: 10/686,180

(22) Filed: Oct. 14, 2003

(65) Prior Publication Data

US 2005/0077867 A1 Apr. 14, 2005

(51) Int. Cl.$^7$ .................................................. H02J 7/04
(52) U.S. Cl. ........................ 320/134; 320/136; 320/128
(58) Field of Search ................................ 320/134, 136, 320/128, 132, 433; 324/425–428

(56) References Cited

U.S. PATENT DOCUMENTS

| | | | |
|---|---|---|---|
| 5,910,722 A | 6/1999 | Lyons et al. | |
| 5,931,757 A | 8/1999 | Schmidt | |
| 6,449,537 B1 | 9/2002 | Phillips et al. | |

*Primary Examiner*—Michael Sherry
*Assistant Examiner*—Robert Grant
(74) *Attorney, Agent, or Firm*—Leslie C. Hodges

(57) ABSTRACT

A method of providing closed-loop control of power flowing into and out of an energy storage system (ESS), wherein the ESS comprises a battery is provided. The method may be implemented as a computer control algorithm for determining the charge and discharge limits for the ESS in a hybrid electric vehicle (HEV), wherein the ESS comprises a battery pack or array. The method comprises determining charge and discharge power limits during each of a plurality of control loops, comparing these limits during each of the plurality of control loops, and providing a charge power limit output and a discharge power limit output for use in a subsequent control loop which are based upon the charge power limit and the discharge power limit. The charge power limit output and discharge power limit output are set equal to the discharge power limit and charge power limit, respectively, when the discharge power limit is greater than the charge power limit; and are selected from the group consisting of the charge power limit, the discharge power limit and zero when the discharge power limit is less than or equal to the charge power limit.

25 Claims, 16 Drawing Sheets

METHOD OF DETERMINING BATTERY POWER LIMITS FOR AN ENERGY STORAGE SYSTEM OF A HYBRID ELECTRIC VEHICLE

TECHNICAL FIELD

This invention comprises a method for controlling the energy storage system (ESS) in a hybrid electric vehicle (HEV). More particularly, the method comprises a computer control algorithm for determining the charge and discharge limits for the battery in an HEV, such that it is protected from damage and yet is capable of maximum available utilization.

BACKGROUND OF THE INVENTION

An HEV is a vehicle that has a propulsion system that consists of at least one electric motor or electric machine in combination with at least one other power source. Typically, the other power source is a gasoline or diesel engine. There are various types of HEVs depending on how the electric motor(s) and other power source(s) are combined with one another in order to provide propulsion for the vehicle, including series, parallel and compound HEVs.

Various hybrid powertrain architectures are known for managing the input and output torques of various propulsion systems in HEVs, most commonly internal combustion engines and electric machines. Series hybrid architectures are generally characterized by an internal combustion engine driving an electric generator which in turn provides electrical power to an electric drivetrain and to an energy storage system, comprising a battery pack. The internal combustion engine in a series HEV is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack.

Parallel HEV architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel HEV powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions (i.e. input split, output split and compound split configurations) thereby enabling high-torque continuously variable speed ratios, electrically dominated launches, regenerative braking, engine off idling, and two-mode operation.

Such complex EVT HEVs utilize one or more electric machines and require advanced energy storage systems (ESS) to supply electrical energy to and receive and store electrical energy from these machines. The ESS typically incorporates a battery pack and associated monitoring and control electronics and algorithms. Given the dynamics associated with operation of an HEV, particularly the constant flow of power into and out of the ESS, the ESS plays a critical role in the operation of these vehicles. The critical role of the ESS in these vehicles imposes a number of requirements on ESS performance, including both operational and service life requirements.

Significant attention has been given to maintaining the operational performance of batteries used as the ESS in HEV applications. Particular attention has been given to various aspects of maintaining the battery pack state of charge (SOC). The SOC is defined generally as the ratio of the residual charge in a battery relative to its full charge capacity. Various hardware and software control strategies have been adjusted for determining and maintaining the SOC of the battery.

While understanding and maintaining the SOC of the battery is critical to its performance in HEV applications, it is not the only important characteristic of the battery. Another critical characteristic of batteries used in HEV applications is the useful life of the battery or battery pack. For example, it is known that secondary batteries, such as Ni-MH batteries, have limited amp-hour throughput that defines their useful service life. The amp-hour throughput or capacity of the battery is the integral of the absolute value of the power flowing through the battery as a function of time as it is constantly charged and discharged in service.

Therefore, since the battery has a limited life, in order for HEVs to compete with other propulsion technologies, it is desirable in some applications to utilize control strategies that will permit the service life of the battery to be managed to particular levels based upon the various parameters that effect battery life such as, amp-hour throughput, overvoltage/undervoltage, temperature.

SUMMARY OF THE INVENTION

The present invention is a method of providing closed-loop control of power flowing into and out of an electrical energy storage system, comprising the steps of: determining a charge power limit comprising a maximum charge power during each of a plurality of control loops; determining a discharge power limit comprising a maximum discharge power during each of the plurality of control loops; comparing the charge power limit and the discharge power limit during each of the plurality of control loops; and providing a charge power limit output and a discharge power limit output for use in a subsequent control loop which are based upon the charge power limit and the discharge power limit, wherein the charge power limit output and discharge power limit output are equal to the discharge power limit and charge power limit, respectively, when the discharge power limit is greater than the charge power limit; and wherein the charge power limit output and discharge power limit output are selected from the group consisting of the charge power limit, the discharge power limit and zero when the discharge power limit is less than or equal to the charge power limit.

This invention overcomes the deficiencies of the prior art by utilizing a closed loop controller with a warning track to determine the power limits for the ESS. The closed loop controller allows the power of the ESS to be available to the system that utilizes the ESS such that the voltage will be controlled precisely to the limit value under all operating conditions. In addition, the use of a warning track approach for determining the voltage limit value improves the robustness of the overvoltage control, particularly in cases of extreme temperature.

BRIEF DESCRIPTION OF THE DRAWINGS

The present invention will become more fully understood from the detailed description given here below, the appended claims, and the accompanying drawings in which:

DESCRIPTION OF THE PREFERRED EMBODIMENT

Figure 1:
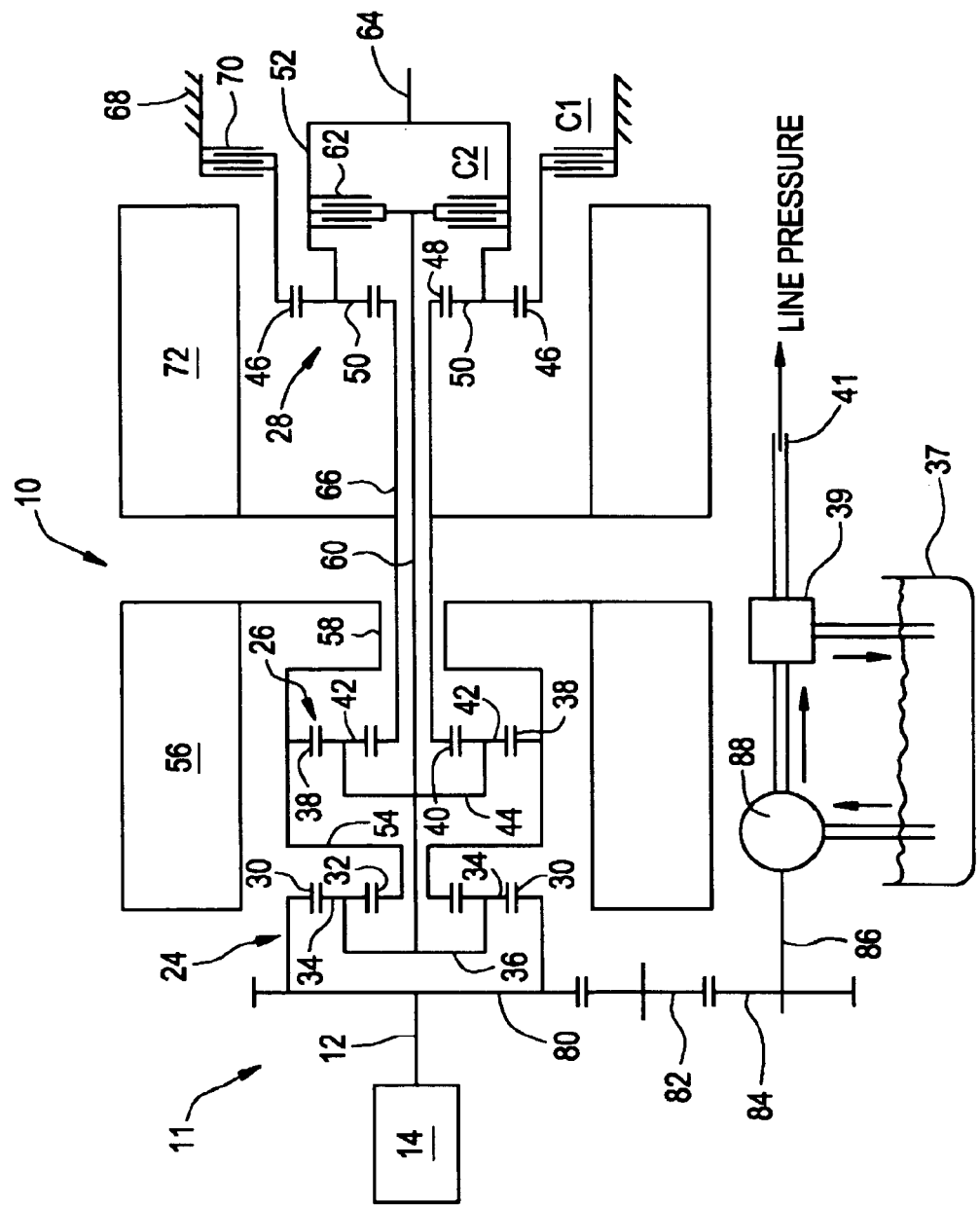
FIG. 1 is a mechanical hardware schematic representation of one preferred form of a two-mode, compound-split, electrically variable transmission particularly suited to the implementation of the present invention.
Figure 2:
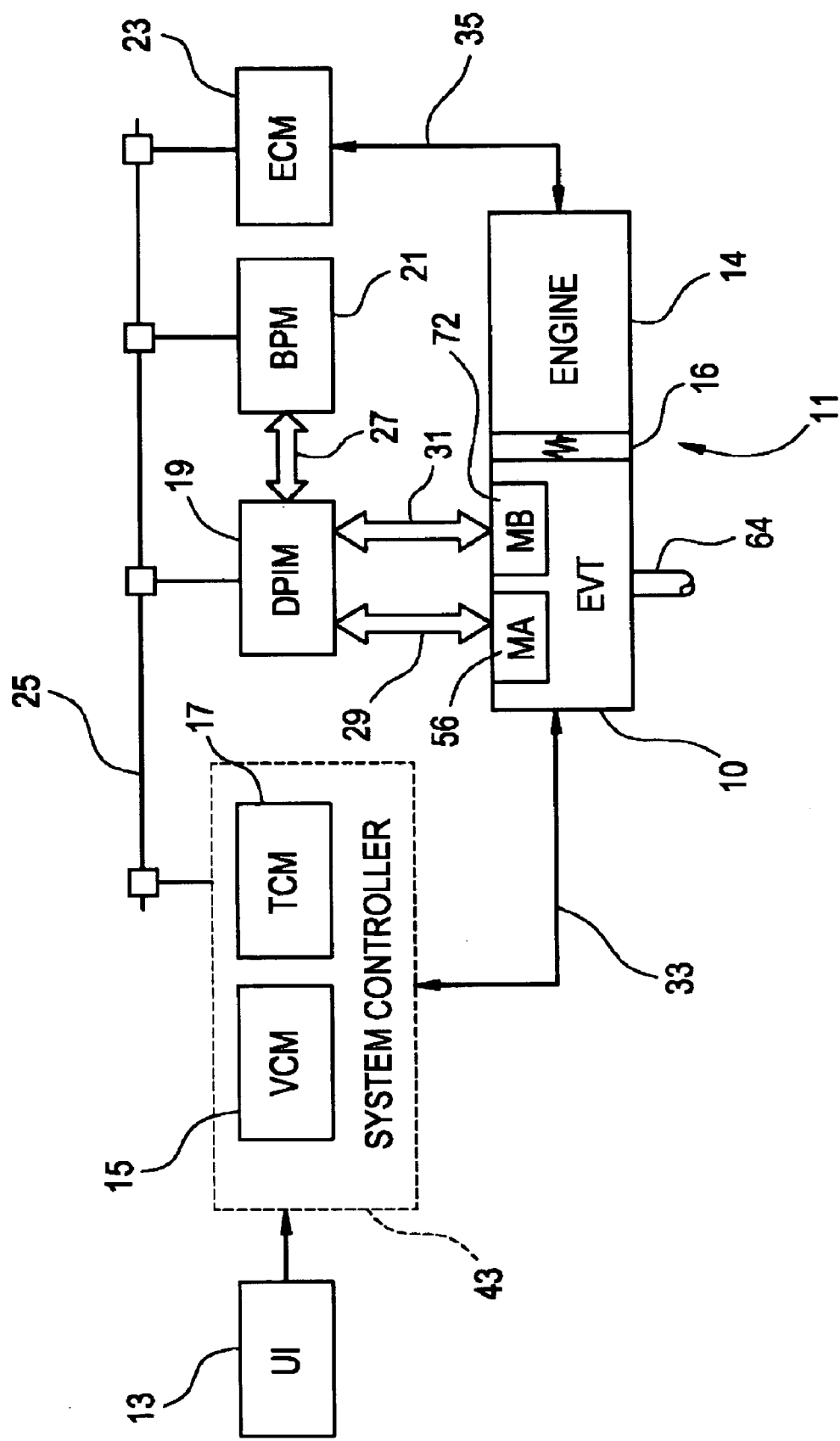
FIG. 2 is an electrical and mechanical schematic of a preferred system architecture for the hybrid powertrain disclosed herein.

With reference first to FIGS. 1 and 2, a vehicular powertrain is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input— operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or $M_A$.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 32 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or $M_B$. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e.: the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (with the) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engines electronics, controls and quantities are generally well known to those skilled in the art and further detailed exposition thereof is not required herein As should be apparent from the foregoing description the EVT 10 selectively receives power from the engine 14. As will now be explained with continued reference to FIG. 2 the EVT also receives power from an electric energy storage device or system 20 (ESS), such as one or more batteries in battery pack module (BPM) 21. As used herein, reference to a battery includes not only a single battery, also includes any combination of single or multiple batteries, or cells thereof, into a battery pack or array, or a plurality of battery packs or arrays. BPM 21 is preferably a parallel array of battery packs, each of which comprises a plurality of batteries. As used herein, the term battery generally refers to any secondary or rechargeable battery, but those comprising lead/acid, nickel/metal hydride (Ni/MH), or Li/ion or polymer cells are preferred. Other electric energy storage devices that have the ability to store electric power through charging and dispense electric power through discharging, such as super capacitors or ultracapacitors, may be used in place of, or in combination with, the batteries without altering the concepts of the present invention. The BPM 21 is high voltage DC (e.g., about 650 V in an exemplary embodiment) coupled to dual power inverter module (DPIM) 19 via DC lines 27. Current is transferable to or from the BPM 21 in accordance with whether the BPM 21 is being charged or discharged. BPM 21 also comprises a conventional microprocessor based controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O), temperature sensors and appropriate signal conditioning and buffer circuitry necessary to monitor the state of the battery and transmit this information to other portions of the control system for use in the overall control of the vehicle, such as VCM 15 and TCM 17. This includes sensing, processing, calculating and otherwise monitoring various parametric information regarding the state or condition of the battery, such as its temperature, current and voltage while charging and discharging, and state of charge (SOC), which comprises the instantaneous amount of energy stored in the battery expressed as a percentage of its total energy storage capacity. This also includes is a transmitting the information concerning these parameters to other portions of the vehicle control system, including the VCM 15 and TCM 17, for use in conjunction with control algorithms which make use of battery parametric information, such as those used to establish SOC-related charge and discharge limits, amp-hour/hour or energy throughput limits, temperature limits or other battery-related control functions.

DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 3 1and provides current to the DC lines 27. The net DC current provided to or from the inverters determines the charge or discharge operating mode of the BPM 21. Preferably, $M_A$ and $M_B$ are three-phase AC machines and the inverters comprise complementary three-phase power electronics. Individual motor speed signals Na and Nb for $M_A$ and $M_B$, respectively, are also derived by the DPIM 19 from the motor phase information or conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, system controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, $M_A$ speed Na and $M_B$ speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others. System controller 43 determines a torque command Te_cmd and provides it to ECM 23. Torque command Te_cmd is representative of the EVT torque contribution desired from the engine as determined by the system controller.

The various modules described (i.e. system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

Figure 3:
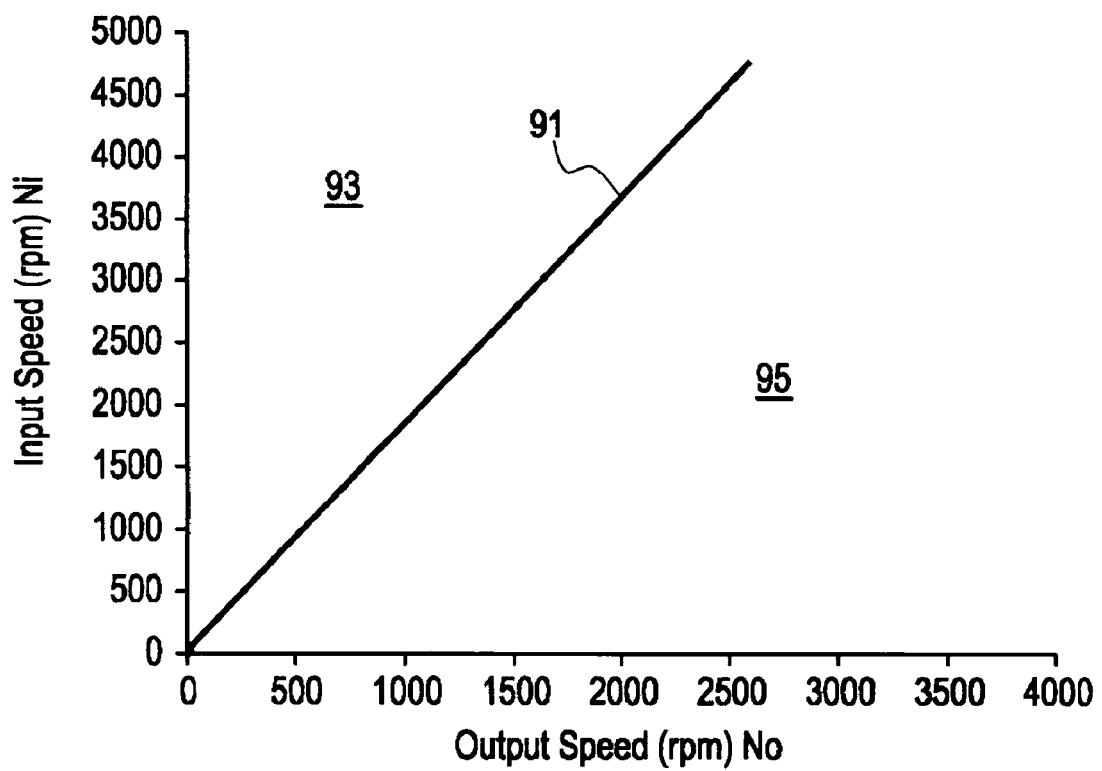
FIG. 3 is a graphical representation of various regions of operation with respect to input and output speeds of the exemplary electrically variable transmission disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be affected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited. While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g. mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g. mass, size, cost, inertial capabilities, etc.) to the high speeds of region 93. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No. Further details regarding the operation of the exemplary EVT can be found in commonly assigned, co-pending U.S. patent application Ser. No. 10/686508, which is hereby incorporated herein by reference in its entirety.

The present invention may be described generally as a method of providing closed-loop control of power flowing into and out of an energy storage system (ESS), wherein the ESS comprises a battery. More particularly, it is a method of providing closed-loop control of power flowing into and out of an energy storage system of a hybrid electric vehicle, wherein the ESS comprises a battery pack or array. Most particularly, it is a computer control algorithm for determining the charge and discharge limits for the ESS in a hybrid electric vehicle (HEV), wherein the ESS comprises a battery pack or array.

In the present invention, certain battery power input and output limits are determined for the ESS such that the battery is protected from damage yet is capable of maximum available utilization within the particular application, such as an HEV. Factors such as extreme state of charge (SOC), voltage, including overvoltage and undervoltage, and current can damage the ESS and thereby reduce its service life. In addition, these parameters are temperature dependent, such that a method for protection and optimization of the ESS and its service life must also take into consideration temperature effects. Further, it is known that the service lives of secondary batteries of the types described herein are related to their cumulative energy throughputs as measured in amp hours, such that it also desirable to control the power throughput in order to increase the service life of the ESS. Therefore, the ESS protection algorithm of the present invention examines each of these parameters and adjusts the power limits such that certain limits on each of the parameters mentioned are not violated. The charge/discharge limits also may be implemented to manage the useful service life of the battery, thereby extending the useful service life or enabling management of the ESS so that a predicted or established useful service life of the battery may be obtained. This is particularly advantageous in applications, such as buses or similar vehicles that are operated in fleets, wherein having a predictable service life of certain vehicle components such as the ESS is highly desirable. The invention is particularly useful for EVT HEVs of the types described above which incorporate electric machine(s) and a CVT(s) in a compound arrangement that require a sophisticated ESS in order to accommodate dynamic charge/discharge conditions in operation.

In an HEV of the types described herein, the ESS comprises one or more vehicle controllers that are adapted to receive a plurality of inputs related to vehicle actual or desired vehicle dynamics, and provide output commands to various of the vehicle systems, such as the engine, engine controller, CVTs, electric machines, braking systems and battery. The ESS includes a battery, typically comprising a parallel array of battery packs comprising a plurality of batteries and may also comprise certain sensors and control electronics.

Figure 4:
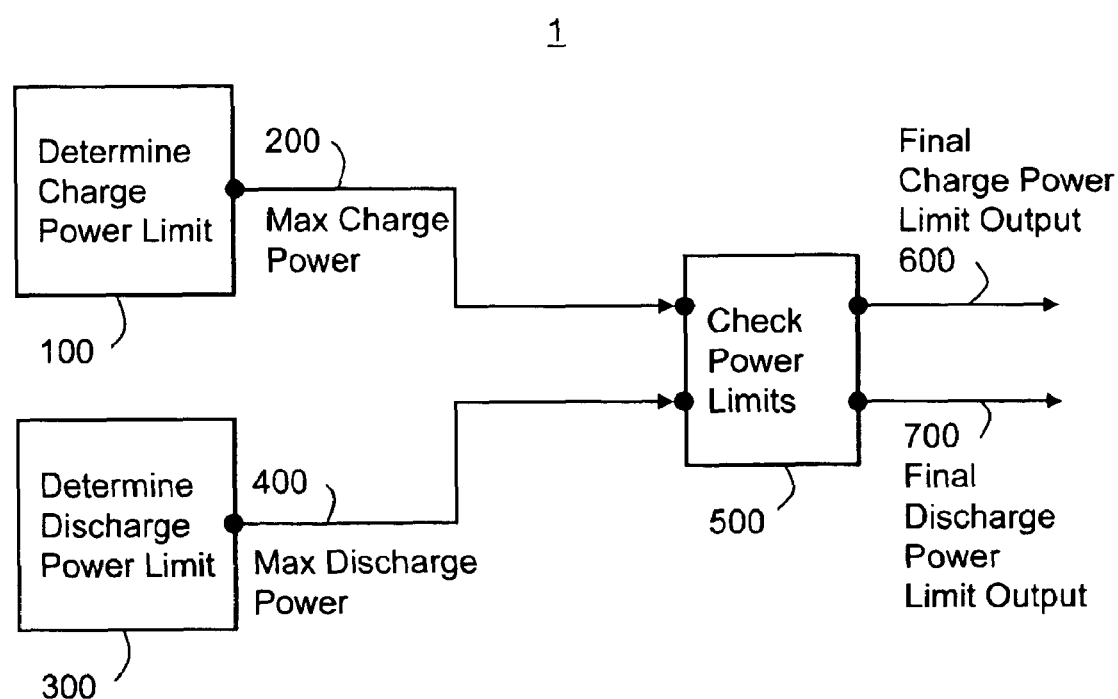
FIG. 4 is a functional block diagram generally illustrating the steps of the method of the present invention.

FIG. 4 illustrates the top-level functional block diagram of the ESS protection algorithm or method 1 of the present invention, a. FIG. 4 shows that individual charging and discharging power limits are determined independently, and then these limits are given an integration check or comparison to ensure that they are not contradictory or conflicting. Referring to FIG. 4, this invention is a method 1 of providing closed-loop control of power flowing into and out of an energy storage system comprising a battery, and includes the steps of: (1) determining a charge power limit 100 comprising a maximum charge power 200 during each of a plurality of control loops; (2) determining a discharge power limit 300 comprising a maximum discharge power 400 during each of the plurality of control loops; (3) comparing or checking the discharge power limit and the charge power limit 500 during each of the plurality of control loops; and (4) providing both a charge power limit output 600 and a discharge power limit output 700 for use in a subsequent control loop which are based upon the discharge power limit 400 and the charge power limit 200, wherein the charge power limit output 600 and discharge power limit output 700 are equal to the charge power limit 200 and discharge power limit 400, respectively, when the discharge power limit 400 is greater than the charge power limit 200; and wherein the charge power limit output 600 and discharge power limit output 700 are selected from the group consisting of the charge power limit 200, the discharge power limit 400 and zero when the discharge power limit 400 is less than or equal to the charge power limit 200. Each of these functional blocks is described in greater detail herein.

Figure 5:
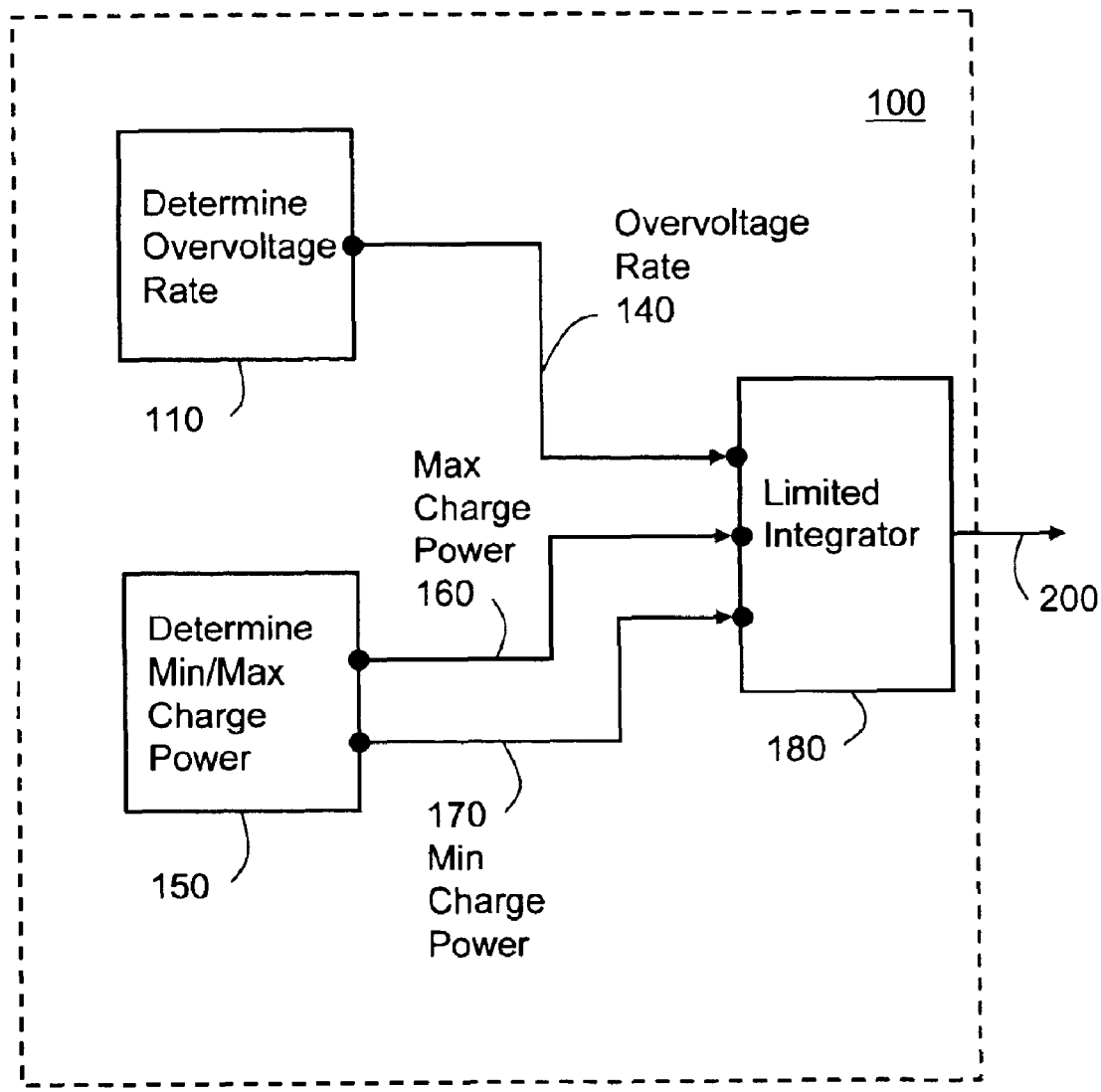
FIG. 5 is a functional block diagram generally illustrating the steps of block 100 of FIG. 4.

FIG. 5 is a block diagram for the step of determining a charge power limit 100 and comprises the further steps of: (1) determining an overvoltage-based power rate limit 110 during each of the plurality of control loops; (2) determining 150 a minimum charge power limit 170 and a maximum charge power limit 160 during each of the plurality of control loops, which are used to set the bounds on an integrator, as described herein, such that the integrated value can never be greater than the maximum or less than the minimum; and (3) performing a limited integration 180 of the overvoltage-based power rate limit, minimum charge power limit and maximum charge power limit as determined in step (2), to determine the maximum charge power limit 200. The integration is performed using a well known digital integration technique. The limits are used to place a bound on the integrated value such that the integrated value can never be greater that the maximum or less than the minimum. Each of these functional blocks is described in greater detail herein.

Figure 7:
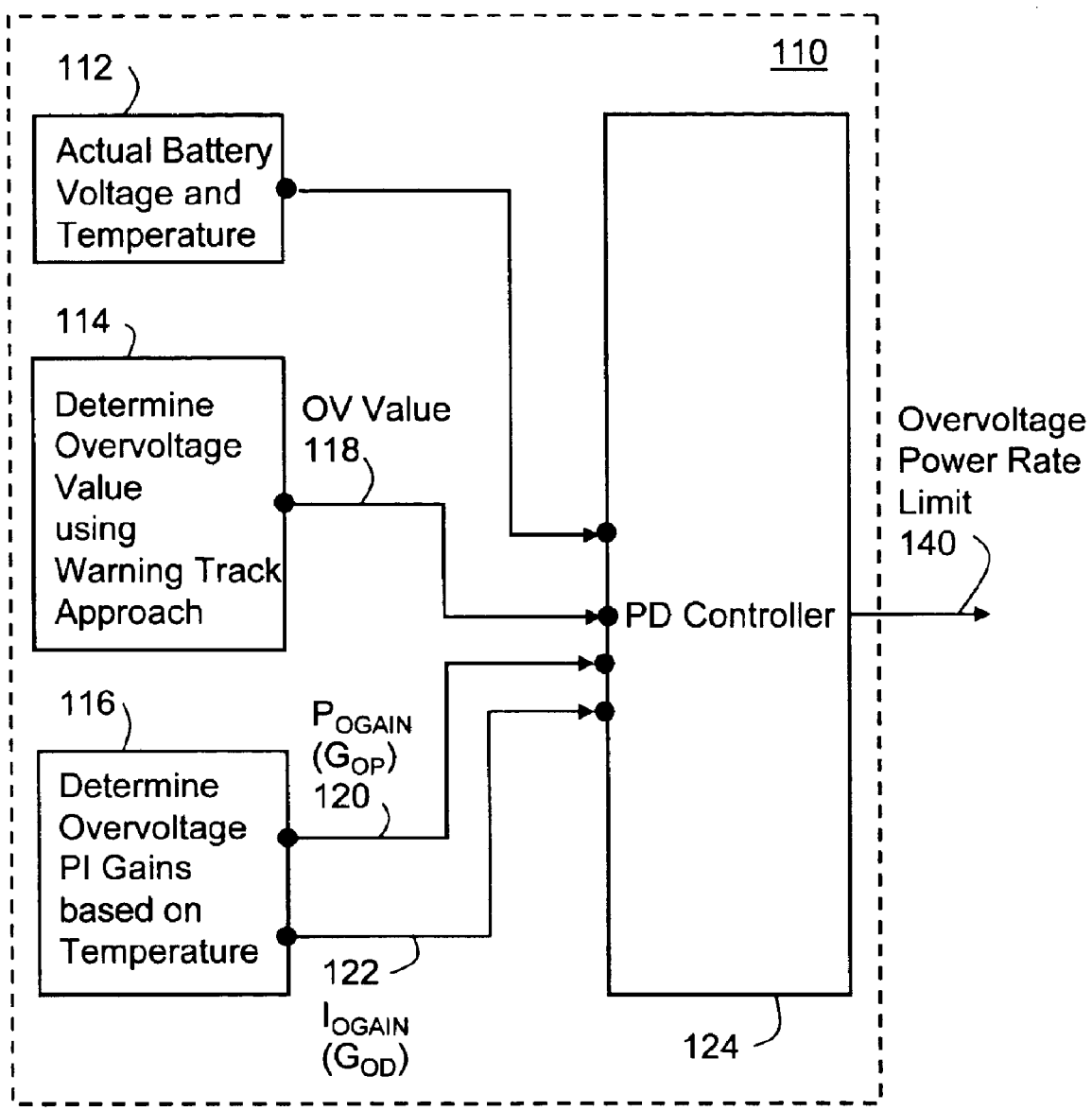
FIG. 7 is a functional block diagram generally illustrating the steps of block 110 of FIG. 5.

The step of determining the overvoltage-based power rate limit 110 is accomplished as shown in FIG. 7, and comprises the further steps of: (1) determining an actual temperature and an actual voltage of the ESS 112; (2) determining an overvoltage value for the battery using a warning track approach 114 as a function of the actual temperature and voltage, wherein the warning track approach avoids the selection of an overvoltage value for use in the control loop that could result in an overvoltage condition in the battery; (3) determining a proportional overvoltage gain ($G_{OP}$, also referred to herein as the $P_{OGAIN}$) and a derivative overvoltage gain ($G_{OD}$, also referred to herein as the $I_{OGAIN}$) 116; and (4) using a proportional derivative (PD) controller 124 to calculate an overvoltage-based power rate limit 140.

The warning track keeps the overvoltage reference limit that is passed on at a value below the actual desired limit where damage could occur. The step of determining the overvoltage value using a warning track approach 114 is performed as illustrated in FIGS. 9, 11, 13 and 14, and comprises the further steps of: (1) determining the temperature of the ESS 112; (2) determining a base overvoltage value for the ESS as a function of the temperature of the ESS; (3) adding a first overvoltage offset to the base overvoltage value to establish a warning track overvoltage value as a function of the temperature of the ESS; (4) adding a second overvoltage offset to the warning track overvoltage value to establish a warning track overvoltage threshold value as a function of the temperature of the ESS (i.e., the warning track threshold value is not a function of temperature, but since the base OV value is, the final warning track threshold is a function of temperature); (5) determining a battery voltage of the ESS as a function of time (i.e., as a single value for each time step (control loop); (6) calculating an overvoltage reference value from the warning track overvoltage value as a function of time and the battery voltage and an overvoltage reference error between the overvoltage reference value and battery voltage using a proportional derivative controller having a proportional overvoltage gain ($G_{OP}$) and a derivative overvoltage gain ($G_{OD}$); and (7) multiplying the overvoltage reference error by the $G_{OP}$ and adding it to the derivative of the voltage reference error multiplied by the $G_{OD}$ to develop an overvoltage-based power rate limit. This does not completely eliminate the possibility of overshoot. In fact, overshoot over the warning track value is expected, it is just that the initial warning track value is well below the actual ESS overvoltage limit so the overshoot over the warning track value does not exceed the actual ESS OV limit. The warning track value, threshold, and offset were determined empirically from experimentation on the vehicle.

The temperature of the battery may be measured by any suitable temperature sensing means such as a thermocouple, or a plurality of thermocouples, which may be integrated into the battery or stand alone sensors. For example, a thermocouple output can be input into one of the electronic control modules used in the vehicle, including the vehicle control module used to perform method 10, for determination of the temperature. Although the determination of the actual battery voltage and actual battery temperature are indicated in the same functional block for ease of illustration, this is not to imply that they must be determined together, simply that they represent actual physical quantities that are used in the determination of the of the overvoltage-based power rate limit.

Figure 9:
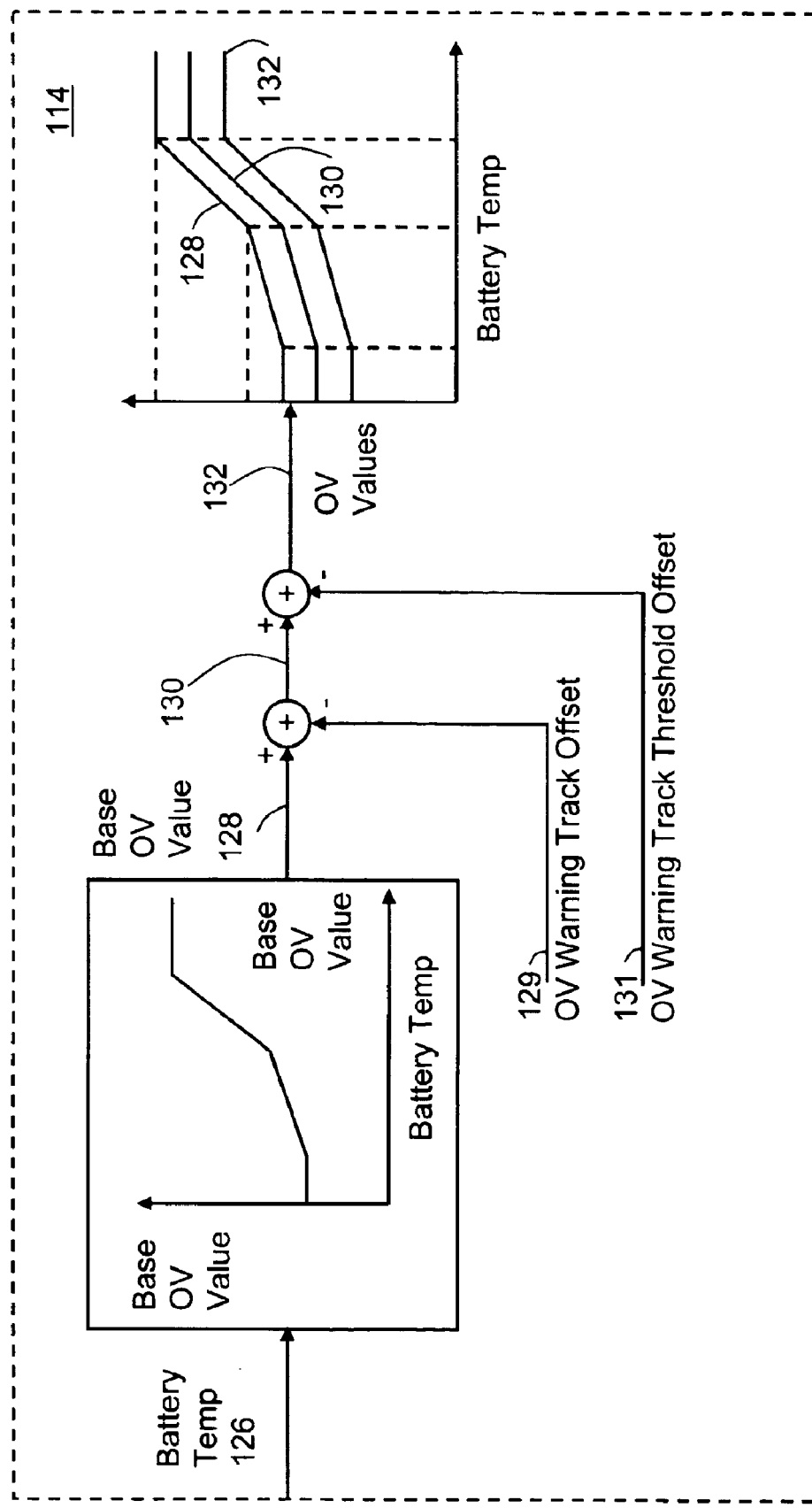
FIG. 9 is a functional block diagram generally illustrating some of the steps of block 114 of FIG. 7.

As illustrated in FIG. 9, the base overvoltage value for a particular battery design may be determined empirically or theoretically for a given battery design as a function of temperature, and the results may be made available for use in the method of this invention by any suitable means, such as incorporation into a look-up table. The first overvoltage offset 129 is determined empirically, and in BPM 21 is preferably about 15V. It may be determined empirically by examining actual vehicle data and tuning the parameters using actual hardware. It may also be determined theoretically through calculation of the maximum charging power, internal resistance of the battery as a function of SOC, open circuit voltage of the battery as a function of SOC, etc. However, modeling of an ESS is rather complex and usually not extremely accurate. Therefore, tuning using actual hardware is preferred. It is typically a negative value and is added to the base overvoltage, thereby reducing the base overvoltage value and establishing a warning track overvoltage value. The second overvoltage offset 131 is also determined empirically and in BPM 21, is preferably is about 10V. It is also typically a negative value and is added to the warning track overvoltage value, thereby reducing the warning track overvoltage value and establishing a warning track overvoltage threshold.

The battery voltage may be determined by any suitable means of detecting the voltage, such as by measuring the full DC bus voltage using a voltage divider and an analog to digital converter in the controller electronics.

Figure 11:
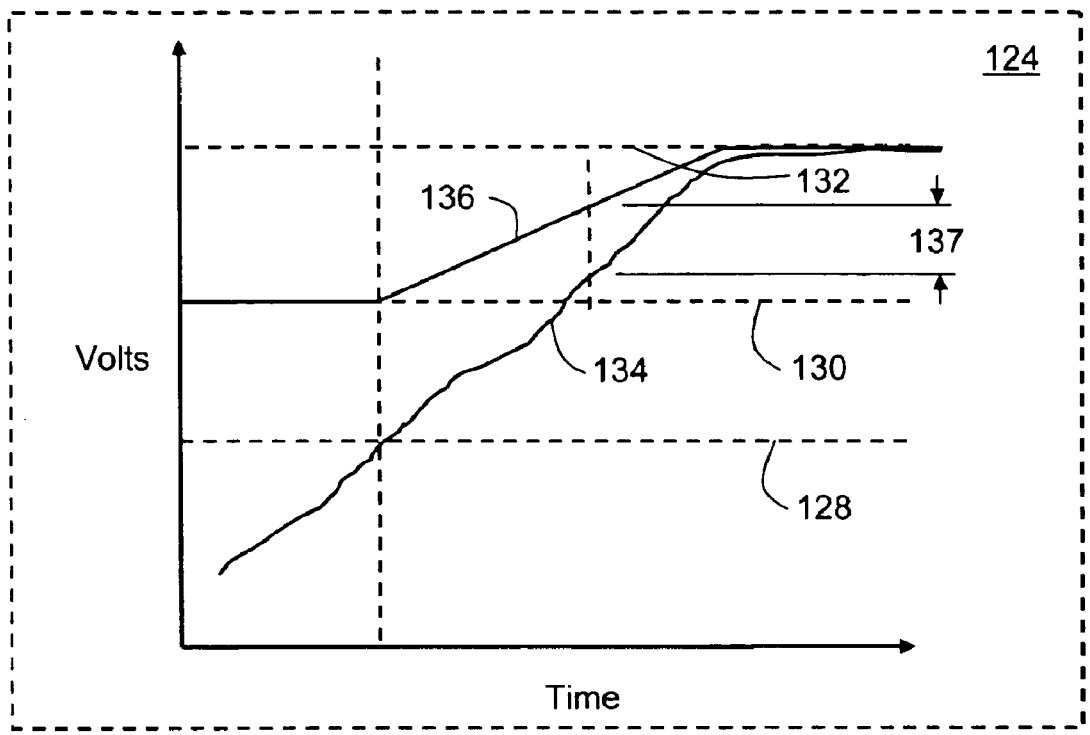
FIG. 11 is a functional block diagram also generally illustrating some of the steps of block 114 of FIG. 7.
Figure 13:
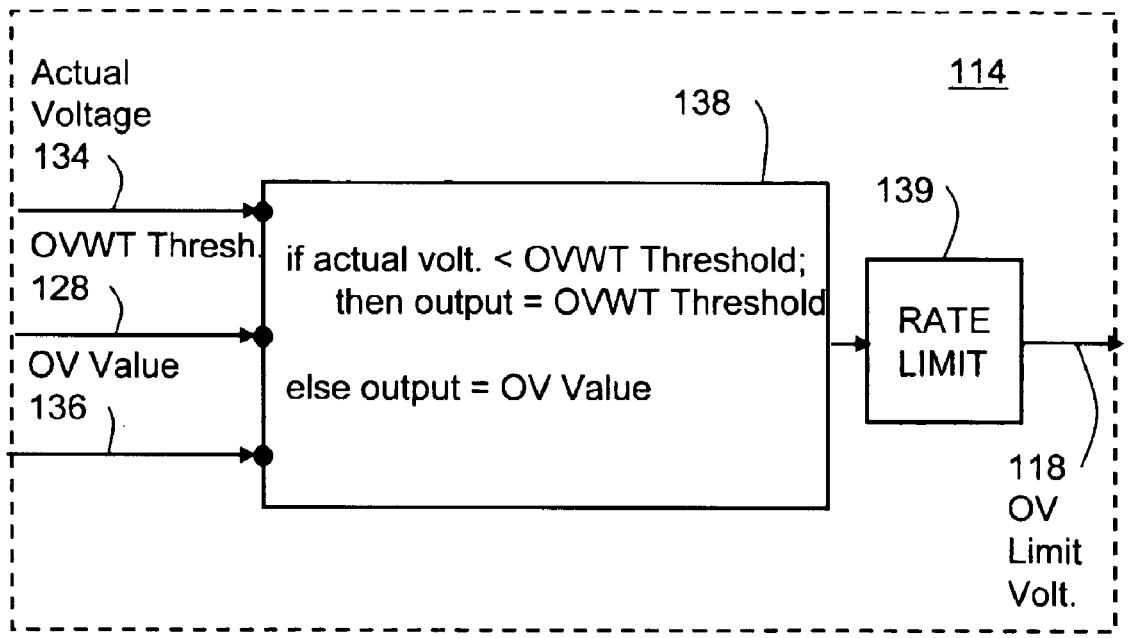
FIG. 13 is a functional block diagram also generally illustrating some of the steps of block 114 of FIG. 7.

The step of calculating an overvoltage reference value from the warning track overvoltage value as a function of time (i.e., as a single value for each time step (control loop) and the battery voltage is illustrated in FIGS. 11 and 13, and may be accomplished by setting the overvoltage reference value equal to the overvoltage warning track threshold when the battery voltage is less than the overvoltage warning track threshold and increasing the overvoltage reference value monotonically at a predetermined overvoltage reference rate from the overvoltage threshold value to the base overvoltage value when the battery voltage is greater than or equal to the overvoltage warning track threshold. When the actual voltage gets to the warning track threshold, the overvoltage reference limit begins to ramp up toward the actual desired base overvoltage limit at a specified rate. Similarly, when the actual voltage drops below the threshold value, the final overvoltage value will ramp back down to the warning track value at a rate independent of the rise rate. In this way, a closed loop controller which controls using the overvoltage reference limit as described herein can begin to work in advance of the overvoltage limit to reduce overshoots when the measured voltage exceeds the warning track value but before it reaches the overvoltage limit. Also, by selection of an appropriate close loop controller, the warning track approach compensates for overshoots and allows the overvoltage reference limit to go the actual overvoltage limit for full utilization of the voltage window without exceeding the overvoltage limit.

Figure 8:
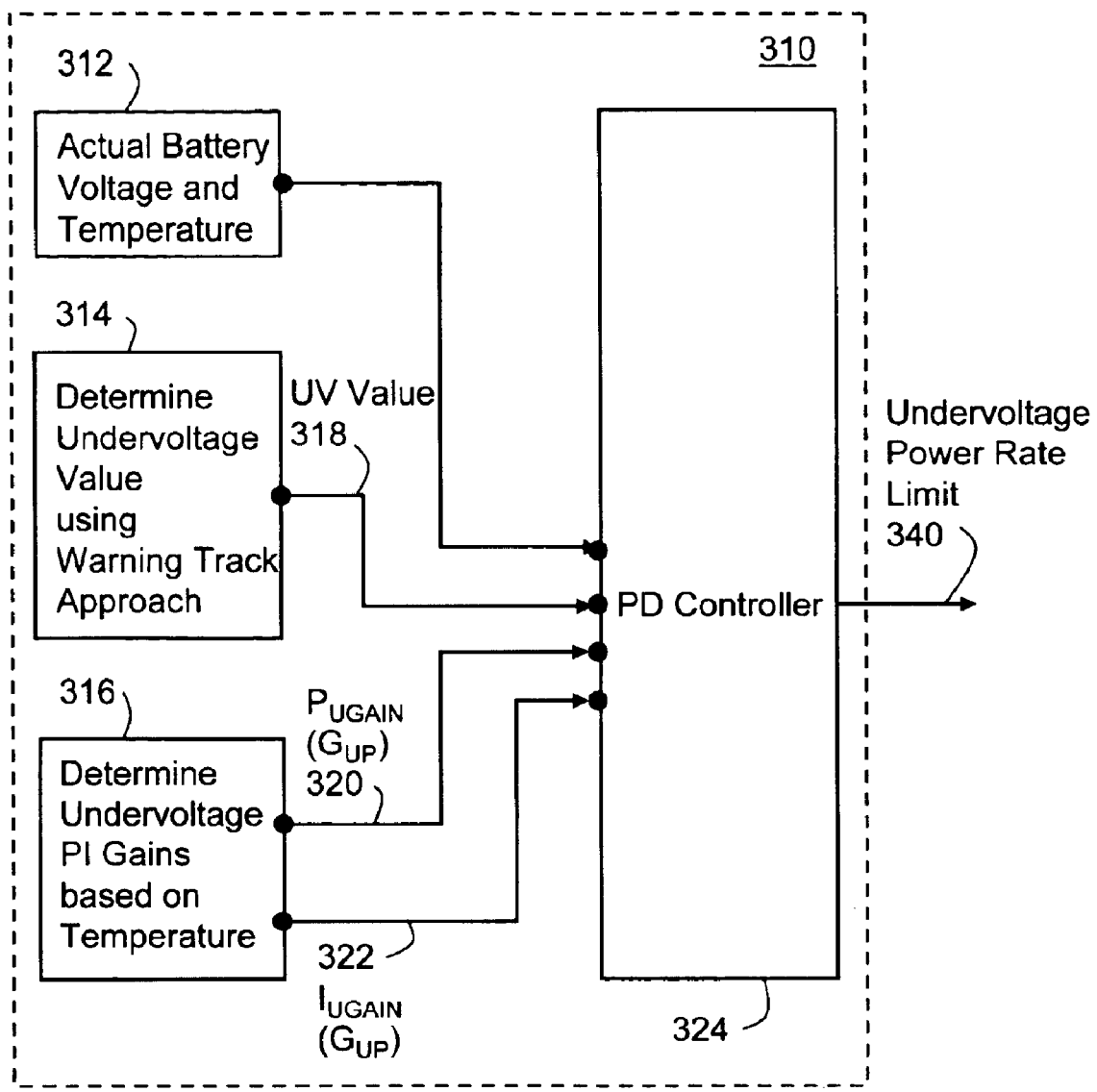
FIG. 8 is a functional block diagram generally illustrating the steps of block 310 of FIG. 6.
Figure 14:
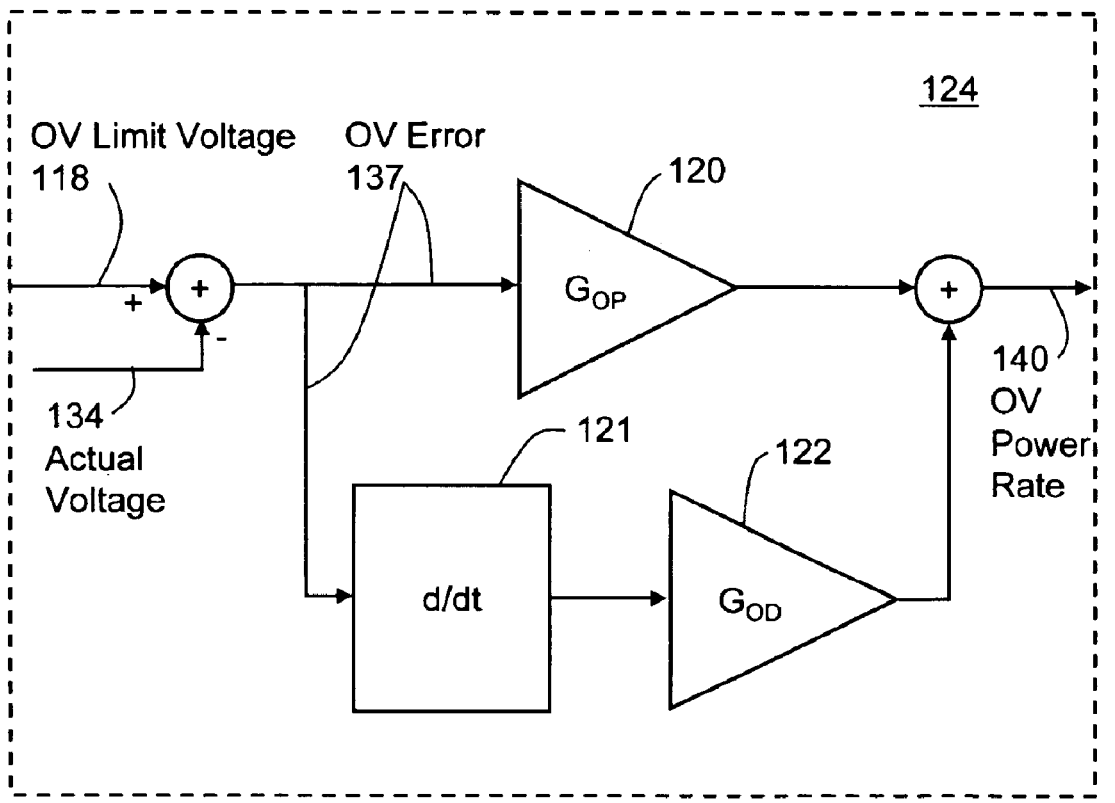
FIG. 14 is a functional block diagram generally illustrating the steps of block 124 of FIG. 7.

Referring to FIG. 7, once the overvoltage reference value has been established, an overvoltage reference error may be calculated as illustrated in FIG. 8 as the difference between the overvoltage reference value and the actual voltage. Once the overvoltage reference error has been calculated, a proportional derivative (PD) controller having a proportional overvoltage gain ($G_{OP}$) and a derivative overvoltage gain ($G_{OD}$) may be used to calculate the overvoltage-based power rate limit by multiplying the overvoltage reference error by $G_{OP}$ and adding it to the derivative of the voltage reference error multiplied by the $G_{OD}$ to develop an overvoltage-based power rate limit, as illustrated in FIG. 13. The PD controller itself finds the error between the voltage limit or the reference, and the actual voltage. This error is then multiplied by a gain to get the proportional part of the PD which is actually the I term of the PI. Also, the derivative of the error is taken and multiplied by a gain the get the D term which actually becomes the P term of the PI. This explains the naming convention shown in FIG. 4 for the PD/PI gain terms. These two terms are then added to get the ESS overvoltage-based power rate limit rate as shown in FIG. 14.

The gains for the PD controller must also be determined. As mentioned above, the ESS charge/discharge response is a function of temperature. In particular, the ESS internal impedance changes with temperature, and the gain scheduling can compensate the response of the closed loop controller based on this impedance change. Therefore, these overvoltage gains ($G_{OP}$ and $G_{OD}$) are simply determined by using lookup tables based on ESS temperature.

Applicants have observed that it is desirable that the base overvoltage value be established as a function of temperature and that the warning track approach be used as it was discovered at very cold temperatures, the closed loop PD controller could oscillate. Simply slowing down the controller was effective to eliminate the oscillation, however, this slower controller, then, allowed the possibility of overshoot in regeneration situations that could exceed the overvoltage limit value. Implementing the warning track approach as a function of temperature allows the overvoltage values to be reduced when the batteries are cold, such that any overshoot due to the use of a slow controller will still maintain the overvoltage reference value below the overvoltage limit, and thereby avoid the possibility of overvoltage damage of the ESS.

Figure 19:
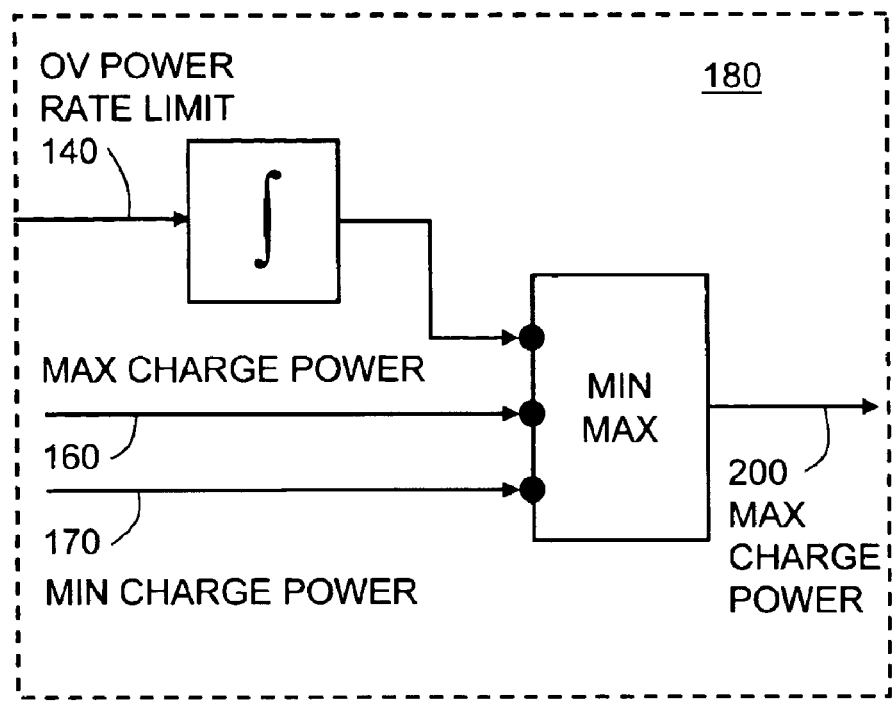
FIG. 19 is a functional block diagram generally illustrating the steps of block 180 of FIG. 5.

The proportional derivative (PD) controller is used to determine the rate at which the ESS power limit can change. Later, the output of the PD controller is integrated to obtain the overvoltage-based power rate limit, as illustrated in FIG. 19. Thus, the proportional term described above actually becomes an integral term and the derivative term described above becomes a proportional term. Therefore, this arrangement actually functions as a PI or IP controller.

Figure 17:
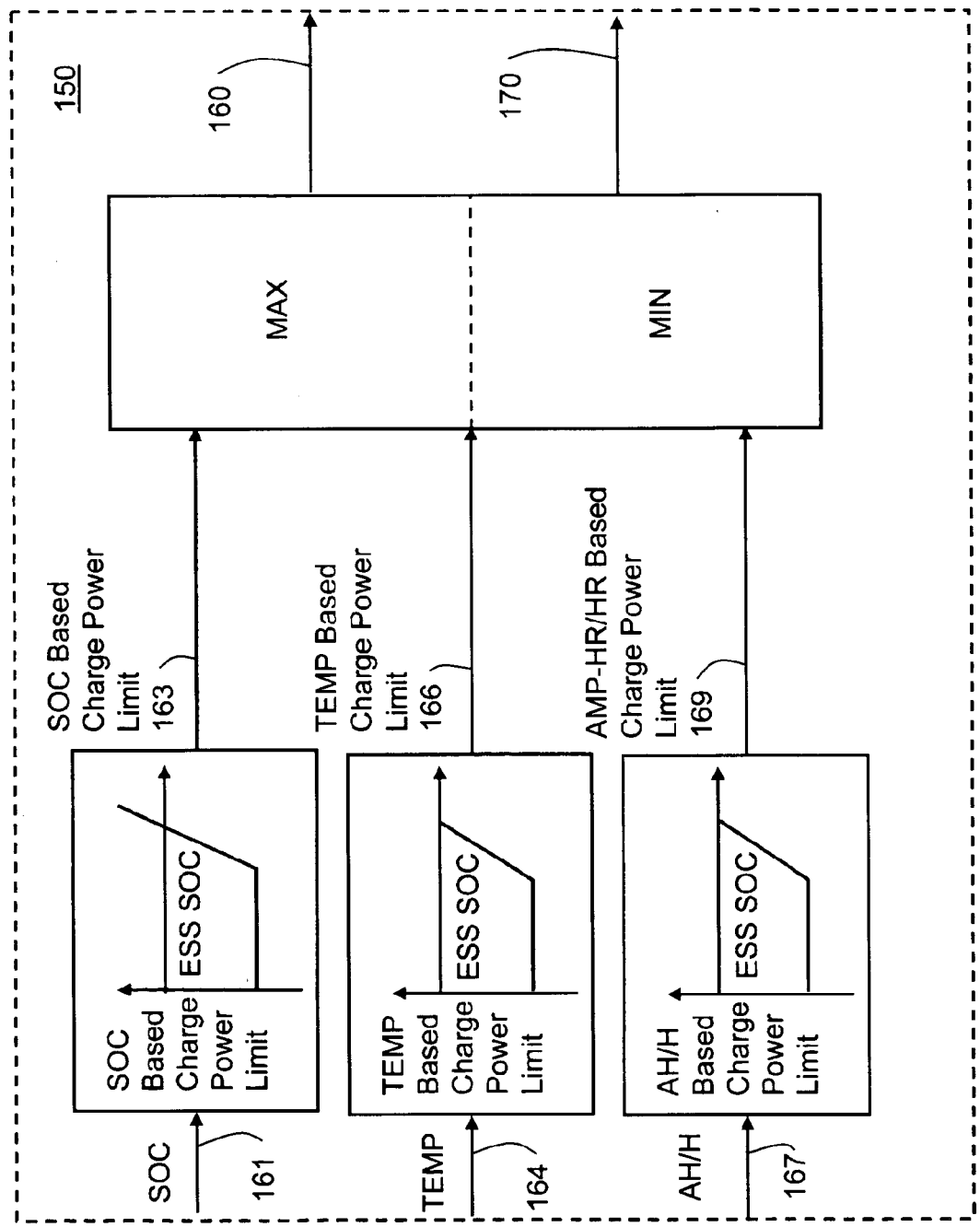
FIG. 17 is a functional block diagram generally illustrating the steps of block 150 of FIG. 5.

Next, the minimum and maximum values of the charge power integrator are determined as illustrated in FIG. 17. These values are based on the SOC, temperature, and amp-hour throughput. Each of these limits is determined using lookup tables based on the particular parameter. For example, the typical form of the charge limit lookup tables associated with these parameters is shown in FIG. 17. For example, for low SOC values, full charging of the ESS is permitted. As the SOC rises above a breakpoint, the charging power limit is reduced such that additional charging that would continue to increase SOC. The power limit is reduced to limit the system from charging at the highest values in cases of higher than desired SOC. Since the system can easily move from charge to discharge as dictated by drive demand, the limits constrain the use of the batteries. Typically a discharge would occur at some time to bring the SOC down and at the next charge opportunity, the system charging would be limited so the SOC would not increase back to the higher value. If SOC continues to increase past the zero power point, the charging limit would actually change sign such that it would set a limit to force discharging of the ESS. The limits for AH/H throughput and temperature are similarly determined except that they do not change sign to force a discharge. Power in either direction functions to increase temperature and amp-hour per hour (AH/H) throughput. The AH/H throughput may be determined by integrating the battery current using a low pass filter as described in commonly assigned, co-pending U.S. provisional patent application Ser. No. 60/511456, which is hereby incorporated herein by reference in its entirety.

Once the overvoltage-based power rate limit, maximum charge power integrator and minimum charge power integrator are determined, a limited integration is performed to determine the maximum charge power, as illustrated in FIG. 19. The integration is performed using a well known digital integration technique with a limiter included to constrain the integrated value to the prescribed limits.

The above description explains how the charge power limit is determined. The discharge power limit is similarly determined with the differences that it is based on undervoltage conditions and low SOC rather than overvoltage and high SOC, as described below.

Figure 6:
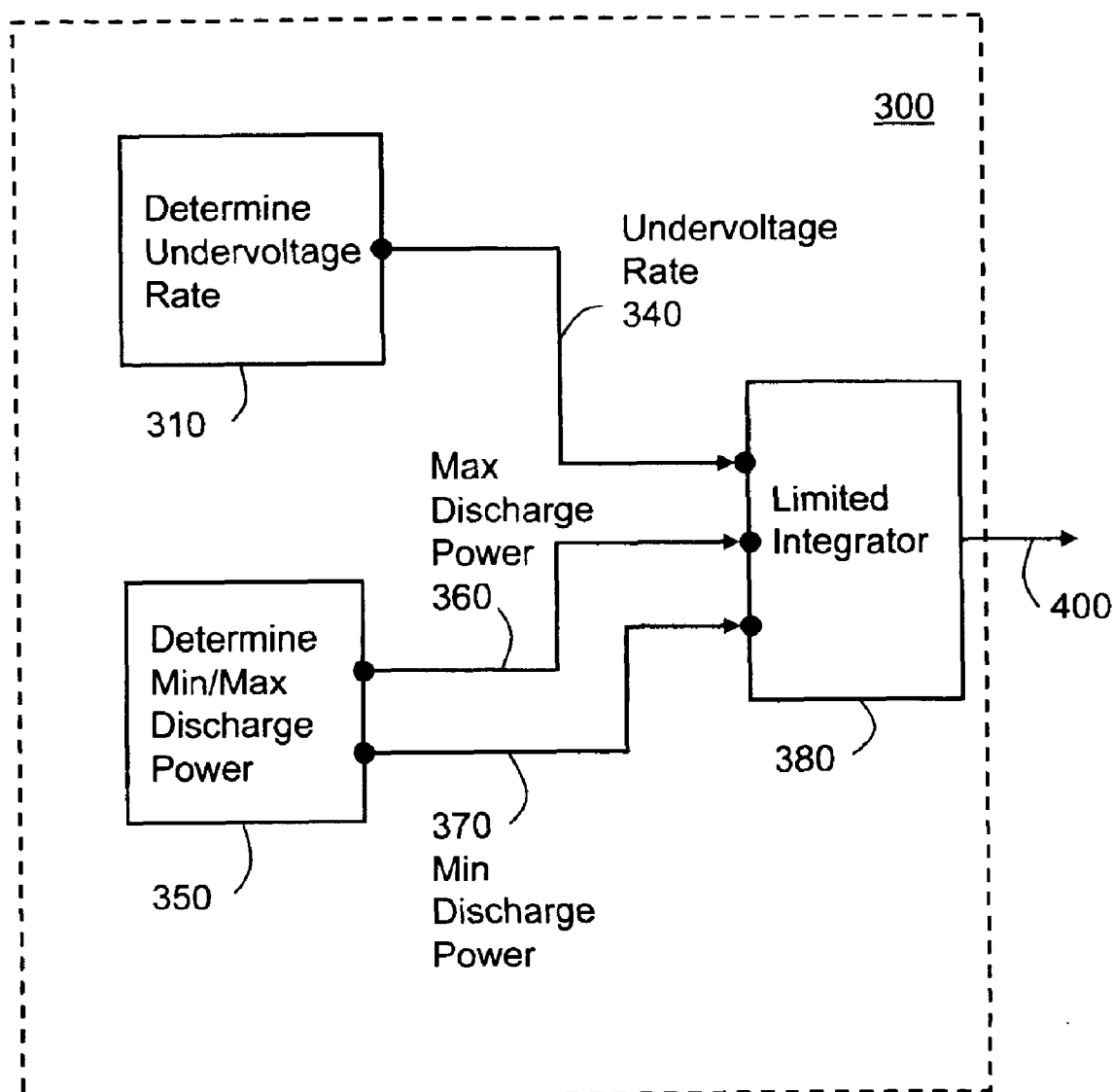
FIG. 6 is a functional block diagram generally illustrating the steps of block 300 of FIG. 4.

FIG. 6 is a block diagram for the step of determining a discharge power limit 300 and comprises the further steps of: (1) determining an undervoltage-based power rate limit 310 during each of the plurality of control loops; (2) determining 350 a minimum discharge power limit 370 and a maximum discharge power limit 360 during each of the plurality of control loops; and performing a limited integration, analogous to that used for charging, of the undervoltage-based power rate limit, minimum discharge power limit and maximum discharge power limit to determine the maximum discharge power 400. Each of these functional blocks is described in greater detail herein.

Figure 10:
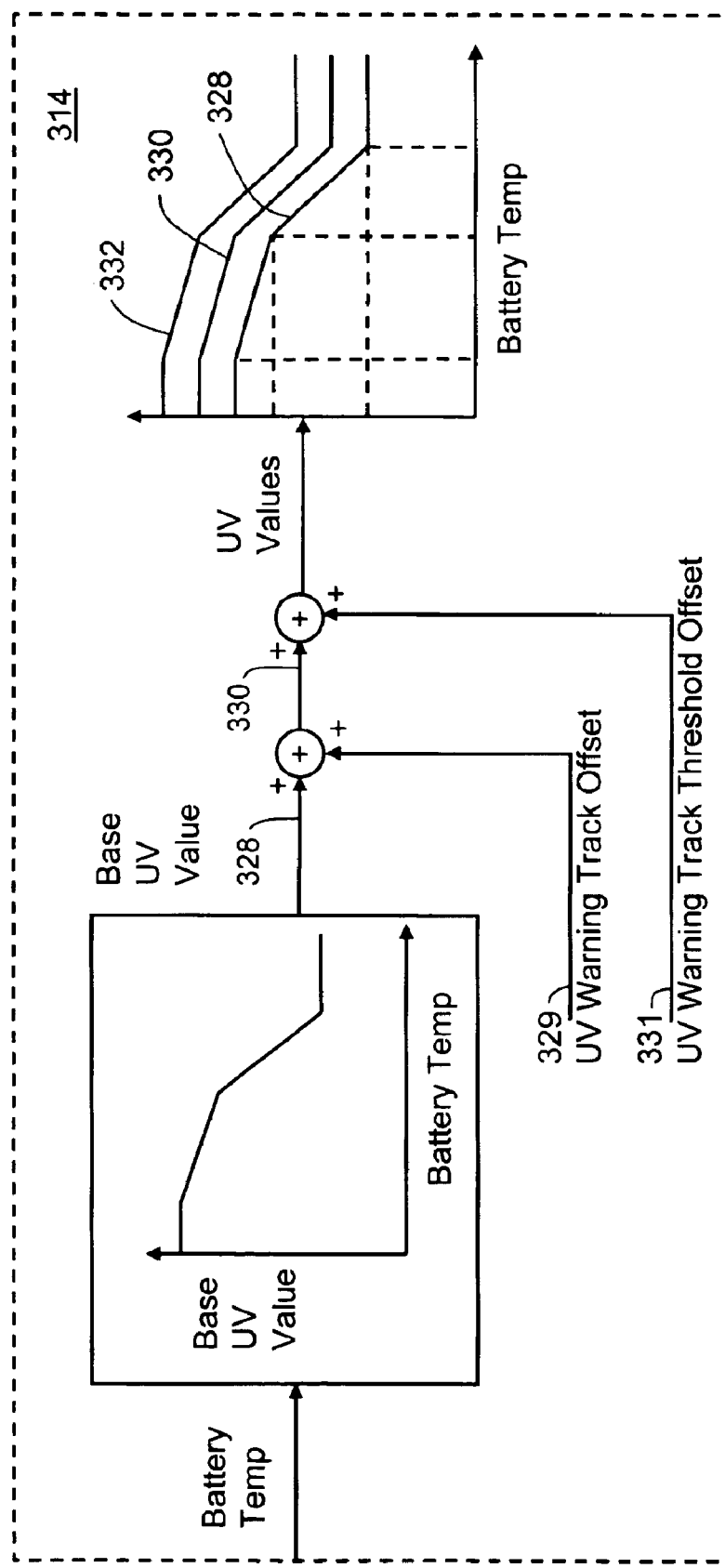
FIG. 10 is a functional block diagram generally illustrating some of the steps of block 314 of FIG. 8.

The step of determining the undervoltage-based power rate limit 310 is accomplished as shown in FIG. 10, and comprises the further steps of: (1) determining an actual temperature and an actual voltage of the ESS 312; (2) determining an undervoltage value for the battery using a warning track approach as a function of the battery temperature 314, wherein the warning track approach avoids the selection of an undervoltage value for use in the control loop that could result in an undervoltage condition in the battery; (3) determining a proportional undervoltage gain ($G_{UP}$, also referred to herein as the $P_{UGAIN}$) and a derivative undervoltage gain ($G_{OD}$, also referred to herein as the $I_{UGAIN}$) 316; and (4) using a proportional derivative (PD) controller 324 to calculate an undervoltage-based power rate limit 340. Referring to FIGS. 7 and 8, controller 124 and controller 324 may be the same controller so long as it is adapted to receive both undervoltage and overvoltage related inputs, or they may comprise two separate controllers.

The warning track keeps the undervoltage reference limit that is passed on at a value below the actual desired limit where damage could occur. The step of determining the undervoltage value using a warning track approach 314 is performed as illustrated in FIGS. 10, 12, 15 and 18, and comprises the further steps of: (1) determining the temperature of the ESS 312; (2) determining a base undervoltage value for the ESS as a function of the temperature of the ESS; 3) adding a first undervoltage offset to the base undervoltage value to establish a warning track undervoltage value as a function of the temperature of the ESS; (4) adding a second undervoltage offset to the warning track undervoltage value to establish a warning track undervoltage threshold value as a function of the temperature of the ESS; (5) determining a battery voltage of the ESS as a function of time(i.e., as a single value for each time step (control loop); (6) calculating an undervoltage reference value from the warning track undervoltage value as a function of time and the battery voltage and an undervoltage reference error between the undervoltage reference value and battery voltage using a proportional derivative controller having a proportional undervoltage gain ($G_{UP}$) and a derivative undervoltage gain ($G_{UD}$); and (7) multiplying the undervoltage reference error by the $G_{UP}$ and adding it to the derivative of the voltage reference error multiplied by the $G_{UD}$ to develop an undervoltage-based power rate limit.

As illustrated in FIG. 10, the base undervoltage value for a particular battery design may be determined empirically or theoretically for a given battery design as a function of temperature, and the results may be made available for use in the method of this invention by any suitable means, such as incorporation into a look-up table. The first undervoltage offset 329 is determined empirically, as described above regarding the overvoltage case description, and for BPM 21 is preferably is about 10V. It is typically a positive value and is added to the base undervoltage, thereby increasing the base undervoltage value and establishing a warning track undervoltage value. The second undervoltage offset 331 is determined similarly and for BPM 21, is preferably about 15V. It is also typically a positive value and is added to the warning track undervoltage value, thereby increasing the warning track undervoltage value and establishing a warning track undervoltage threshold.

Figure 12:
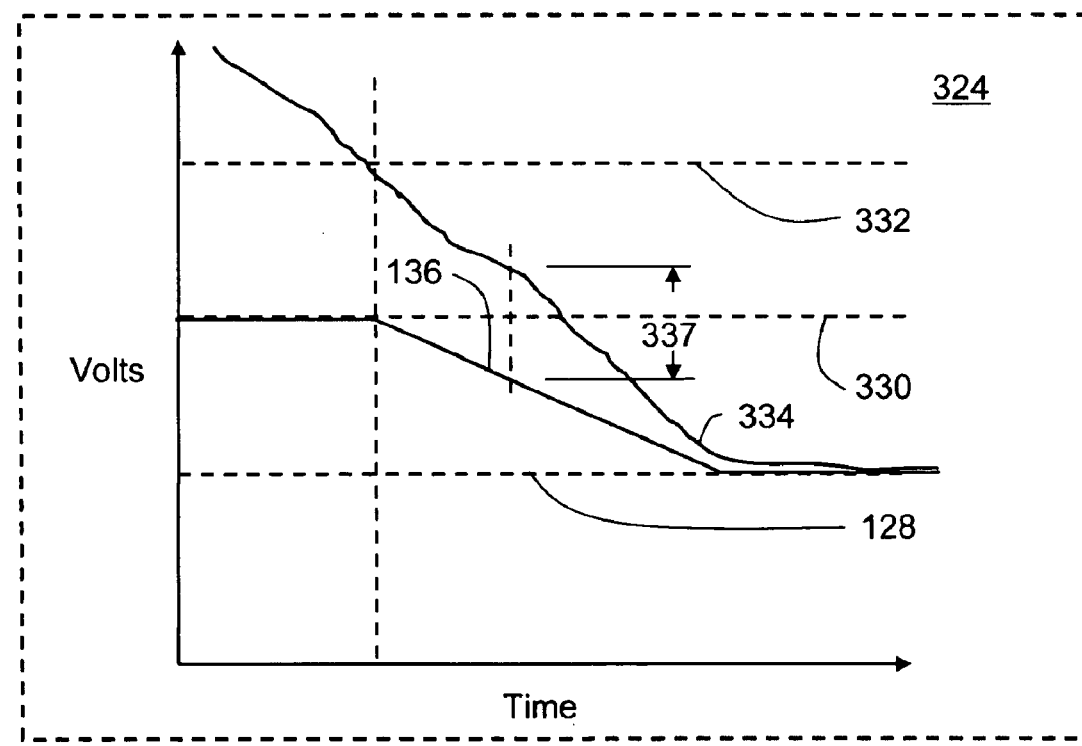
FIG. 12 is a functional block diagram also generally illustrating some of the steps of block 314 of FIG. 8.
Figure 15:
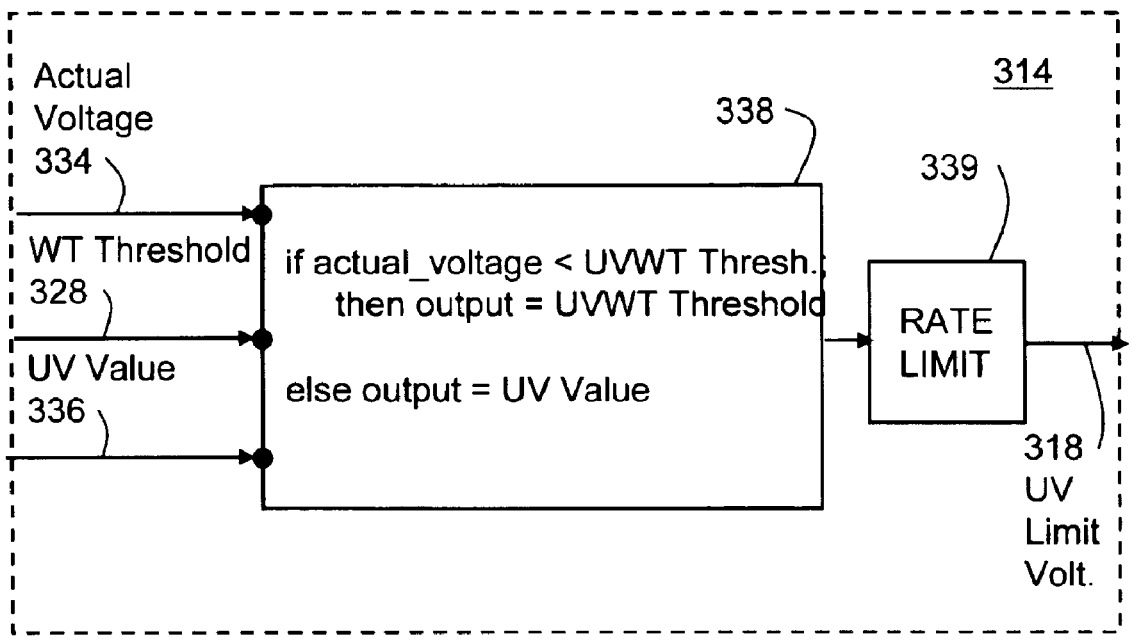
FIG. 15 is a functional block diagram also generally illustrating some of the steps of block 314 of FIG. 8.

The step of calculating an undervoltage reference value from the warning track undervoltage value as a function of time and the battery voltage is illustrated in FIGS. 12 and 15, and may be accomplished by setting the undervoltage reference value equal to the undervoltage warning track threshold when the battery voltage is greater than the undervoltage warning track threshold and decreasing the undervoltage reference value monotonically at a predetermined undervoltage reference rate from the undervoltage threshold value to the base undervoltage value when the battery voltage is less than or equal to the undervoltage warning track threshold. When the actual voltage gets to the warning track threshold, the undervoltage reference limit begins to ramp down toward the actual desired undervoltage limit at a specified rate. Similarly, when the actual voltage rises above the threshold value, the final undervoltage value will ramp back up to the warning track value at a rate independent of the fall rate. In this way, a closed loop controller which controls using the undervoltage reference limit as described herein can begin to work in advance of the undervoltage limit to reduce undershoots when the measured voltage exceeds the warning track value but before it reaches the undervoltage limit. Also, by selection of an appropriate close loop controller, the warning track approach compensates for undershoots and allows the undervoltage reference limit to go the actual undervoltage limit for full utilization of the voltage window without going under the undervoltage limit.

Figure 16:
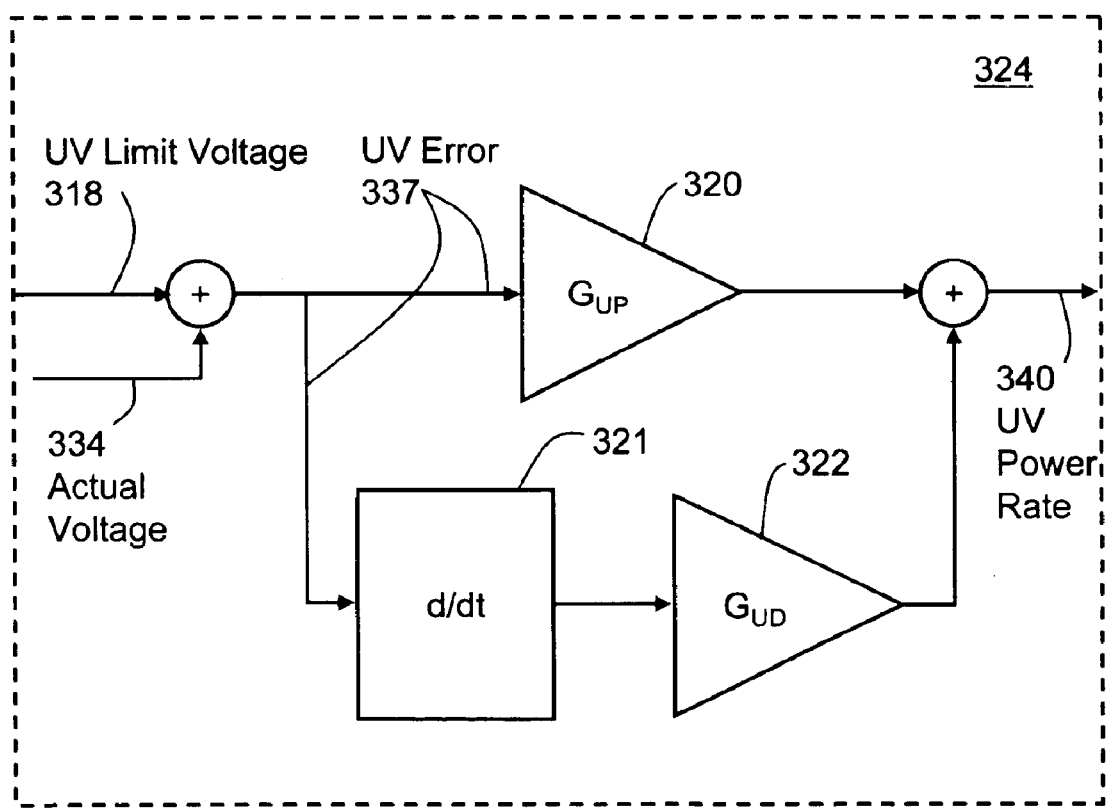
FIG. 16 is a functional block diagram generally illustrating the steps of block 324 of FIG. 8.

Referring to FIG. 5, once the undervoltage reference value has been established, an undervoltage reference error may be calculated as illustrated in FIG. 9 as the difference between the undervoltage reference value and the actual voltage. Once the undervoltage reference error has been calculated, a proportional derivative (PD) controller having a proportional undervoltage gain ($G_{UP}$) and a derivative undervoltage gain ($G_{UD}$) may be used to calculate the undervoltage-based power rate limit by multiplying the undervoltage reference error by $G_{UP}$ and adding it to the derivative of the voltage reference error multiplied by the $G_{UD}$ to develop an undervoltage-based power rate limit, as illustrated in FIG. 15. The PD controller itself finds the error between the voltage limit or the reference, and the actual voltage. This error is then multiplied by a gain to get the proportional part of the PD which is actually the I term of the PI. Also, the derivative of the error is taken and multiplied by a gain the get the D term which actually becomes the P term of the PI. This explains the naming convention shown in FIG. 8 for the PD/PI gain terms. These two terms are then added to get the ESS undervoltage-based power rate limit rate as shown in FIG. 16.

The gains for the PD controller must also be determined. As mentioned above, the ESS charge/discharge response is a function of temperature. In particular, the ESS internal impedance changes with temperature, and the gain scheduling can compensate the response of the closed loop controller based on this impedance change. Therefore, the undervoltage gains ($G_{UP}$ and $G_{UD}$) are simply determined by using lookup tables based on ESS temperature.

Applicants have observed that it is desirable that the base undervoltage value be established as a function of temperature and that the warning track approach be used as it was discovered at very cold temperatures, the closed loop PD controller could oscillate. Simply slowing down the controller was effective to eliminate the oscillation, however, this slower controller, then, allowed the possibility of undershoot in regeneration situations that could exceed the undervoltage limit value. Implementing the warning track approach as a function of temperature allows the undervoltage values to be reduced when the batteries are cold, such that any undershoot due to the use of a slow controller will still maintain the undervoltage reference value below the undervoltage limit, and thereby avoid the possibility of undervoltage damage of the ESS, according to damage mechanisms that are well known.

Figure 20:
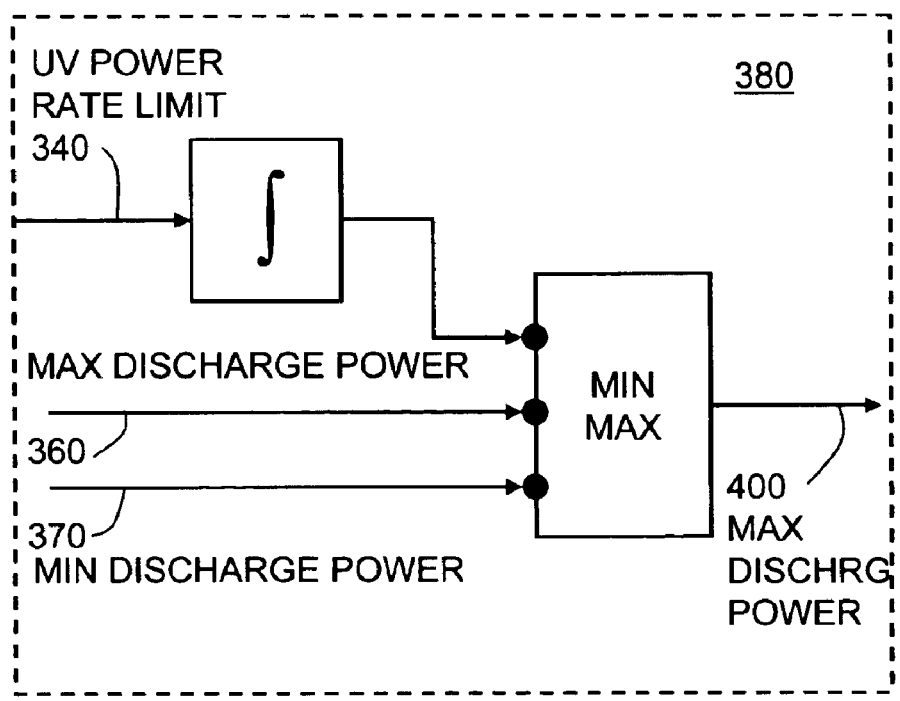
FIG. 20 is a functional block diagram generally illustrating the steps of block 380 of FIG. 6.

The proportional derivative (PD) controller is used to determine the rate at which the ESS power limit can change. Later, the output of the PD controller is integrated to obtain the undervoltage-based power rate limit, as illustrated in FIG. 20. Thus, the proportional term described above actually becomes an integral term and the derivative term described above becomes a proportional term. Therefore, this arrangement actually functions as a PI or IP controller.

Figure 18:
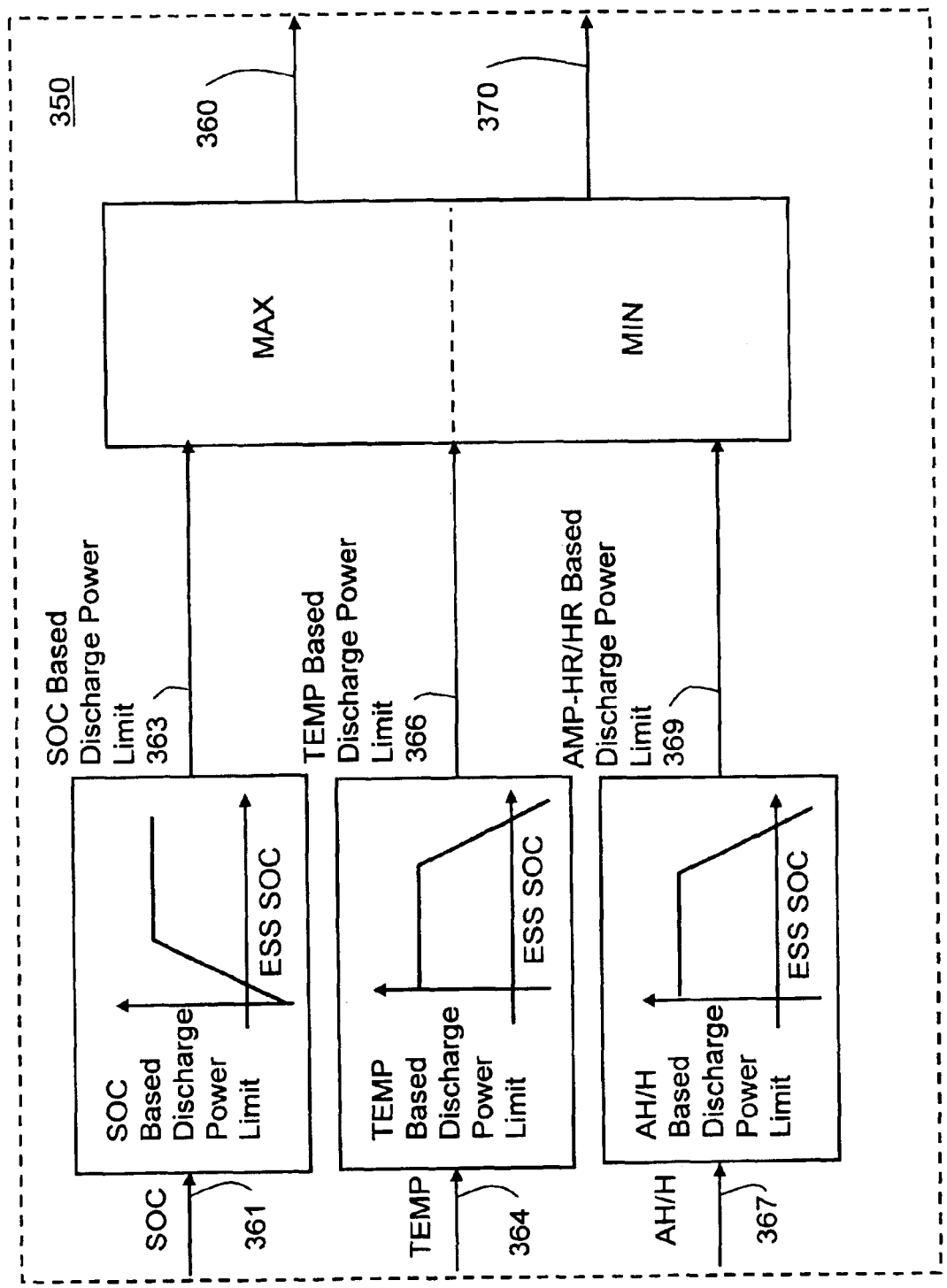
FIG. 18 is a functional block diagram generally illustrating the steps of block 350 of FIG. 6.

Next, the minimum and maximum values of the discharge power integrator are determined as illustrated in FIG. 18. These values are based on the SOC, temperature, and amp hour throughput. Each of these limits is determined using lookup tables based on the particular parameter. For example, the typical form of the discharge limit lookup tables associated with these parameters is shown in FIG. 18. For example, for high SOC values, full discharging of the ESS is permitted. As the SOC falls below a breakpoint, the discharging power limit is reduced such that additional discharging that would continue to decrease SOC below the minimum SOC is avoided. If SOC continues to decrease past the zero power point, the discharging limit would actually change sign such that it would set a limit to force charging of the ESS. The limits for AH throughput and temperature are similarly determined.

Once the undervoltage-based power rate limit, maximum discharge power integrator and minimum discharge power integrator are determined, a limited integration is performed to determine the maximum discharge power, as illustrated in FIG. 20.

Referring to FIG. 4, once the maximum charge power and maximum discharge power have been determined, it is necessary to test or check the power limits 500 to determine if the charge power limit 200 and the discharge power limit 400 are consistent, such that they can each be passed out directly as outputs, or whether they are inconsistent or conflicting, such that the values determined must be filtered prior to passing them out in order to avoid providing either a charge power limit or discharge power limit that is erroneous or conflicting with the other limit. If such a condition exists, a mismatch has occurred and the input power limits must be filtered prior to output in order to avoid introducing instability into the closed loop control.

In the method of this invention, charging power has the opposite sign from discharging power, wherein charging power quantities are generally negative and discharging power quantities are generally positive quantities. However, it is possible in conjunction with the charging power portions of the algorithm to generate a positive maximum charge power limit 200, which in effect is a discharge power value. Likewise, it is possible in conjunction with the discharging power portions of the algorithm to generate a negative maximum discharge power value 400, which in effect is a charge power value. When either of these conditions exist, an inconsistent or mismatch condition is possible. Further, if the maximum charge power 200 is greater than the maximum discharge power 400, an inconsistent solution or mismatch has occurred as the charging power limit 200 requires the system to discharge more than the discharge power limit 400 allows or, conversely, the discharge power limit 400 requires more charging than the charging power limit 200 allows. Several possible mismatch conditions exist, and the filter applied to each is described below.

If a mismatch exists (i.e., charge power limit is greater than the discharge power limit) and both limits are greater than zero or indicate a discharge condition (i.e., a positive maximum charge power), then the input maximum discharge power limit 400 may be used to the extent that it is consistent with the input charge power limit 200, and the discharge power limit output 700 may be set to be equal to maximum discharge power limit 400, which will by definition be less than the input charge power limit 200 because of the mismatch. In this case, the value of the maximum charge power limit 200 is not a consistent as it conflicts with the maximum discharge limit 400, so it cannot be used and is set to zero. This allows the ESS system to issue a discharge power limit output up to the smaller of the two discharging limits, but does not allow the system to charge.

Similarly, if a mismatch exists (i.e., charge power limit is greater than the discharge power limit) and both limits are less than zero or indicate a charge condition (i.e., a negative maximum discharge power), then the input maximum charge power limit 200 may be used to the extent that it is consistent with the input discharge power limit 400, and the charge power limit output 600 may be set to be equal to maximum charge power limit 200, which will by definition be greater than the input discharge power limit 200 because of the mismatch. The charge power limit 200 is the greater charge limit, considering that charging is negative power. In this case, the value of the maximum discharge power limit 400 is not a consistent as it conflicts with the maximum charge limit 200, so it cannot be used and is set to zero. This allows the ESS system to issue a charge power limit output up to the smaller of the two input charging limits, but does not allow the system to discharge.

To see if both limits are discharging, the algorithm makes sure a mismatch occurs then looks to see if the larger of the limits is greater than zero. To see if both limits are charging, the algorithm makes sure a mismatch occurs then looks to see if the larger of the limits (the minimum absolute value) is less than zero. The first step checks to see if charge is greater than discharge, if so, the algorithm continues to identify the nature of the mismatch and act, as described herein. If not, the algorithm simply passes the limits.

Another mismatch condition is possible, where the charge power limit is greater than zero and the discharge power limit is less than zero. In this case, neither the value of the maximum charge power limit 200 nor the value of the maximum discharge power limit 400 are consistent as each conflicts with the other, so neither can be used and both are set to zero.

A final special condition exists if both the charge power limit and the discharge power limit are equal to zero, in which case, both limits are passed as zeros.

It will be apparent to those skilled in the art, that although the invention has been described in terms of specific and preferred embodiments and examples, modifications and changes may be made to the disclosed embodiments without departing from the essence of the invention. Words used herein are words of description rather than of limitation. It is, therefore, to be understood, that the appended claims are intended to cover all modifications which naturally flow from the foregoing description and examples.

What is claimed is:

1. A method of providing closed-loop control of power flowing into and out of an electrical energy storage system, comprising the steps of:

determining a charge power limit comprising a maximum charge power during each of a plurality of control loops;

determining a discharge power limit comprising a maximum discharge power during each of the plurality of control loops;

comparing the charge power limit and the discharge power limit during each of the plurality of control loops; and providing a charge power limit output and a discharge power limit output for use in a subsequent control loop which are based upon the charge power limit and the discharge power limit, wherein the charge power limit output and discharge power limit output are equal to the discharge power limit and charge power limit, respectively, when the discharge power limit is greater than the charge power limit; and wherein the charge power limit output and discharge power limit output are selected from the group consisting of the charge power limit, the discharge power limit and zero when the discharge power limit is less than or equal to the charge power limit.

2. The method of claim 1, wherein the step of determining a charge power limit, comprises the further steps of:

determining an overvoltage-based power rate limit during each of the plurality of control loops;

determining a minimum charge power limit and a maximum charge power limit during each of the plurality of control loops; and performing a limited integration of the overvoltage-based power rate limit, minimum charge power limit and maximum charge power limit to determine the maximum charge power.

3. The method of claim 2, wherein the step of determining the overvoltage-based power rate limit comprises the further steps of:

determining a temperature and a voltage of the ESS;

determining an overvoltage value for the battery using a warning track approach as a function of the battery temperature and voltage, wherein the warning track approach avoids the selection of an overvoltage value for use in the control loop that could result in an overvoltage condition in the ESS;

determining a proportional overvoltage gain ($G_{OP}$) and a derivative overvoltage gain ($G_{OD}$); and calculating an overvoltage-based power rate limit as a function of the overvoltage value and the battery voltage using a proportional derivative controller.

4. The method of claim 3, wherein the step of determining an overvoltage value using the warning track approach, comprises the further steps of:

determining a base overvoltage value for the ESS as a function of the temperature of the ESS;

adding a first overvoltage offset to the base overvoltage value to establish a warning track overvoltage value as a function of the temperature of the ESS;

adding a second overvoltage offset from the warning track overvoltage value to establish a warning track overvoltage threshold value of the ESS; and determining an overvoltage value as a function of time, temperature and ESS voltage.

5. The method of claim 4, wherein the base overvoltage value is selected from a look-up table as a function of the ESS temperature, the first overvoltage offset comprises a scalar voltage value.

6. The method of claim 5, wherein the step of determining the overvoltage value comprises setting the overvoltage reference value equal to the overvoltage warning track threshold when the battery voltage is less than the overvoltage warning track threshold, increasing the overvoltage reference value monotonically at a predetermined overvoltage reference rate from the overvoltage threshold value to the base overvoltage value when the ESS voltage is greater than or equal to the overvoltage warning track threshold.

7. The method of claim 6, wherein the predetermined overvoltage reference value is selected from a look-up table as a function of the ESS temperature.

8. The method of claim 3, wherein the step of calculating the overvoltage-based power rate limit comprises the further steps of:

determining an overvoltage reference error between the overvoltage reference value and ESS voltage;

multiplying the overvoltage reference error by $G_{OP}$ and adding it to the derivative of the voltage reference error multiplied by the $G_{OD}$ to develop an overvoltage-based power rate limit.

9. The method of claim 2, wherein the step of determining a minimum charge power limit and a maximum charge power limit comprises selecting each of the minimum charge power limit and a maximum charge power limit from a respective look-up table.

10. The method of claim 9, wherein the step of performing the limited integration comprises a comparison of parametric ESS limits from the group consisting of ESS temperature, SOC and amp-hour per hour throughput.

11. The method of claim 1, wherein the step of determining a discharge power limit, comprises the further steps of:

determining an undervoltage-based power rate limit during each of the plurality of control loops;

determining a minimum discharge power limit and a maximum discharge power limit during each of the plurality of control loops; and performing a limited integration of the undervoltage-based power rate limit, minimum discharge power limit and maximum discharge power limit to determine the maximum discharge power.

12. The method of claim 11, wherein the step of determining the undervoltage-based power rate limit comprises the further steps of:

determining a temperature and a voltage of the ESS;

determining an undervoltage value for the battery using a warning track approach as a function of the battery temperature and voltage, wherein the warning track approach avoids the selection of an undervoltage value for use in the control loop that could result in an undervoltage condition in the battery;

determining a proportional undervoltage gain ($G_{UP}$) and a derivative undervoltage gain ($G_{UD}$); and calculating an undervoltage-based power rate limit as a function of the undervoltage value and the battery voltage using a proportional derivative controller.

13. The method of claim 12, wherein the step of determining an undervoltage value using the warning track approach, comprises the further steps of:

determining a base undervoltage value for the ESS as a function of the temperature of the ESS;

adding a first undervoltage offset to the base overvoltage value to establish a warning track undervoltage value as a function of the temperature of the ESS;

adding a second undervoltage offset from the warning track undervoltage value to establish a warning track undervoltage threshold value; and determining an undervoltage value as a function of time, temperature and battery voltage.

14. The method of claim 13, wherein the base undervoltage value is selected from a look-up table as a function of the ESS temperature, the first undervoltage offset comprises a scalar voltage value and the second undervoltage offset comprises a scalar voltage value.

15. The method of claim 14, wherein the step of determining the undervoltage value comprises setting the undervoltage reference value equal to the undervoltage warning track threshold when the battery voltage is less than the undervoltage warning track threshold, increasing the undervoltage reference value monotonically at a predetermined undervoltage reference rate from the undervoltage threshold value to the base undervoltage value when the battery voltage is less than or equal to the undervoltage warning track threshold.

16. The method of claim 15, wherein the predetermined undervoltage reference rate is selected from a look-up table as a function of the ESS temperature.

17. The method of claim 12, wherein the step of calculating the undervoltage-based power rate limit comprises the further steps of:

determining an undervoltage reference error between the undervoltage reference value and battery voltage;

multiplying the undervoltage reference error by $G_{UP}$ and adding it to the derivative of the voltage reference error multiplied by the $G_{UD}$ to develop an undervoltage-based power rate limit.

18. The method of claim 11, wherein the step of determining a minimum discharge power limit and a maximum discharge power limit comprises selecting each of the minimum discharge power limit and a maximum discharge power limit from a respective look-up table.

19. The method of claim 18, wherein the step of performing the limited integration comprises a comparison of parametric ESS limits from the group consisting of ESS temperature, SOC and amp-hour per hour throughput.

20. A method of providing closed-loop control of power flowing into and out of an energy storage system of a hybrid electric vehicle, comprising the steps of:

determining a charge power limit comprising a maximum charge power during each of a plurality of control loops by determining an overvoltage-based power rate limit during each of the plurality of control loops, determining a minimum charge power limit and a maximum charge power limit during each of the plurality of control loops, and performing a limited integration of the overvoltage-based power rate limit, minimum charge power limit and maximum charge power limit to determine the maximum charge power;

determining a discharge power limit comprising a maximum discharge power during each of the plurality of control loops by determining an undervoltage-based power rate limit during each of the plurality of control loops, determining a minimum discharge power limit and a maximum discharge power limit during each of the plurality of control loops, and performing a limited integration of the undervoltage-based power rate limit, minimum discharge power limit and maximum discharge power limit to determine the maximum discharge power;

comparing the discharge power limit and the charge power limit during each of the plurality of control loops; and providing a charge power limit output and a discharge power limit output for use in a subsequent control loop which are based upon the charge power limit and the discharge power limit, wherein the charge power limit output and discharge power limit output are equal to the discharge power limit and charge power limit, respectively, when the discharge power limit is greater than the charge power limit; and wherein the charge power limit output and discharge power limit output are selected from the group consisting of the charge power limit, the discharge power limit and zero when the discharge power limit is less than or equal to the charge power limit.

21. The method of claim 20, wherein the step of determining an overvoltage-based power rate limit, comprises the further steps of:

determining the temperature of the ESS determining a base overvoltage value for the ESS as a function of the temperature of the ESS;

subtracting an first overvoltage offset from the base overvoltage value to establish a warning track overvoltage value as a function of the temperature of the ESS;

subtracting an second overvoltage offset from the warning track overvoltage value to establish a warning track overvoltage threshold value as a function of the temperature of the ESS;

determining a battery voltage of the ESS as a function of time;

calculating an overvoltage reference value from the warning track overvoltage value as a function of time and the battery voltage and an overvoltage reference error between the overvoltage reference value and battery voltage using a proportional derivative controller having a proportional overvoltage gain ($G_{OP}$) and a derivative overvoltage gain ($G_{OD}$); and multiplying the overvoltage reference error by the $G_{OP}$ and adding it to the derivative of the voltage reference error multiplied by the $G_{OD}$ to develop an overvoltage-based power rate limit.

22. The method of claim 21, wherein the step of determining an undervoltage-based power rate limit, comprises the further steps of:

determining the temperature of the ESS determining a base undervoltage value for the ESS as a function of the temperature of the ESS;

adding a first undervoltage offset from the base undervoltage value to establish an warning track undervoltage value as a function of the temperature of the ESS;

adding a second undervoltage offset from the warning track undervoltage value to establish a warning track undervoltage threshold value as a function of the temperature of the ESS;

determining the battery voltage of the ESS as a function of time during the control loop calculating an undervoltage reference value from the warning track undervoltage value as a function of time and the battery voltage and a undervoltage reference error between the undervoltage reference value and battery voltage using a proportional derivative controller having a proportional undervoltage gain ($G_{UP}$) and a derivative undervoltage gain ($G_{UD}$); and multiplying the undervoltage reference error by the $G_{UP}$ and adding it to the derivative of the undervoltage reference error multiplied by the $G_{UD}$ to develop an undervoltage-based power rate limit.

23. The method of claim 22, wherein the step of determining a minimum charge power limit and a maximum charge power limit comprises selecting each of the minimum charge power limit and a maximum charge power limit from a respective look-up table, and wherein the step of determining a minimum discharge power limit and a maximum discharge power limit comprises selecting each of the minimum discharge power limit and a maximum discharge power limit from a respective look-up table.

24. The method claim 23, wherein the step of performing the limited integration comprises a comparison of parametric ESS limits from the group consisting of ESS temperature, SOC and amp-hour per hour throughput.

25. The method of claim 20, wherein when the discharge power limit is greater than the charge power limit; the maxim discharge power output is set equal to the maximum discharge power value and the maximum charge power is set equal to zero when both the maximum charge power and maximum discharge power are greater than zero; the maxim charge power output is set equal to the maximum charge power value and the maximum discharge power is set equal to zero when both the maximum charge power and maximum discharge power are less than zero; and the maxim charge power output and maximum discharge power output are set equal to zero when the maximum charge power is greater than zero and the maximum discharge power is less than zero.

* * * * *